United States Patent [19]

Bristol

[11] Patent Number: 5,371,895
[45] Date of Patent: Dec. 6, 1994

[54] LOCAL EQUIPMENT CONTROLLER FOR COMPUTERIZED PROCESS CONTROL APPLICATIONS UTILIZING LANGUAGE STRUCTURE TEMPLATES IN A HIERARCHICAL ORGANIZATION AND METHOD OF OPERATING THE SAME

[75] Inventor: Edgar H. Bristol, Foxboro, Mass.

[73] Assignee: The Foxboro Company, Foxboro, Mass.

[21] Appl. No.: 769,116

[22] Filed: Sep. 30, 1991

Related U.S. Application Data

[63] Continuation-in-part of Ser. No. 344,492, Apr. 26, 1989, which is a continuation of Ser. No. 165,190, Mar. 7, 1988, abandoned, which is a continuation of Ser. No. 785,575, Oct. 8, 1985, Pat. No. 4,736,320.

[51] Int. Cl.$^5$ .............................. G06F 15/18
[52] U.S. Cl. ..................... 395/800; 364/191; 364/DIG. 1; 364/221.9; 364/274.1; 364/275; 395/159
[58] Field of Search ............... 395/800, 159; 364/138, 364/139, 198, 191

[56] References Cited

U.S. PATENT DOCUMENTS

| | | | |
|---|---|---|---|
| 3,668,653 | 6/1972 | Fair et al. | 340/172.5 |
| 4,215,406 | 7/1980 | Gomola et al. | 364/468 |
| 4,215,407 | 7/1980 | Gomola et al. | 364/468 |
| 4,227,245 | 10/1980 | Edblad et al. | 364/468 |
| 4,315,315 | 2/1982 | Kossiakoff | 364/300 |
| 4,451,895 | 5/1984 | Sliwkowski | 364/521 |
| 4,470,107 | 9/1984 | Daab | 364/140 |
| 4,490,781 | 12/1984 | Kishi et al. | 364/191 |
| 4,546,435 | 10/1985 | Herbert et al. | 364/300 |
| 4,547,847 | 10/1985 | Olig et al. | 364/148 |
| 4,570,217 | 2/1986 | Allen et al. | 364/188 |
| 4,628,435 | 12/1986 | Tashiro et al. | 364/130 |
| 4,656,603 | 4/1987 | Dunn | 364/900 |
| 4,663,704 | 5/1987 | Jones et al. | 364/188 |
| 4,695,977 | 9/1987 | Hansen et al. | 364/900 |
| 4,736,320 | 4/1988 | Bristol | 364/300 |
| 4,737,919 | 4/1988 | Kanamori et al. | 364/474 |
| 4,823,255 | 4/1989 | Tanaka et al. | 364/191 |
| 4,907,167 | 3/1990 | Skeirik | 364/139 |
| 4,910,691 | 3/1990 | Skeirik | 364/138 |
| 4,965,742 | 10/1990 | Skeirik | 364/191 |
| 4,975,865 | 12/1990 | Carrette et al. | 364/139 |
| 5,006,992 | 4/1991 | Skeirik | 364/148 |

*Primary Examiner*—Alyssa H. Bowler
*Assistant Examiner*—Mehmet Gecki
*Attorney, Agent, or Firm*—Wolf, Greenfield & Sacks

[57] ABSTRACT

A computer controlled equipment controller and method of operating the same for controlling industrial process control equipment which uses a language structure and data structure specifically adapted for use in constructing computer programs for controlling chemical and physical processing. A translator converts to compilable code programs written as statements expressing control intentions or results. Provision is made for treating the program structure (i.e., control connections, program order, and components, etc.) as part of the dynamic state of the application. Graphical symbols, or icons, are employed to draw the eye to critical features in the control program and to lead the eye through critical interrelationships among the several commands of a control system. At the same time, the translator treats the keystrokes generating these icons as statements (i.e., commands) which define the relationships among other associated program statements (which are usually textual commands) to control the order in which the operations represented by those statements are executed.

10 Claims, 20 Drawing Sheets

TO FIG. 2B

FIG. 2C
FROM FIG. 2B

PROCEDURES:

RECIPE:
```
CLEAR LOG
"LOAD RETORT"LOG; ?LOG
"BATCH ID?"LOG; BATCHID?LOG
"PRODUCT?"LOG; PRODUCT?LOG
((PRODUCT))
RUNBATCH
```

STEW:
```
VENTTIME=2
HEATTIME=20
COOKTEMP=190
COOLTIME=15
COOK:
    COOKTIME=FUNCTION(PRODTEMP)
◊   NOT COOK: END◊
```

| X | Y |
|---|---|
| 165 | 120 |
| 180 | 85 |
| 190 | 70 |
| 200 | 60 |
| 210 | 50 |

TUNA:
```
VENTTIME=2
HEATTIME=15
COOKTEMP=185
COOLTIME=12
COOK:
    COOKTIME=FUNCTION(PRODTEMP)
◊   NOT COOK: END◊
```

| X | Y |
|---|---|
| 165 | 120 |
| 180 | 85 |
| 190 | 70 |
| 200 | 40 |
| 210 | 30 |

《End of Listing》

ARRANGEMENT OF FIGS 2A, 2B, 2C

```
MC100:      T100     T101     T102     T100AV     P100
  States: MANUAL/SETUP/RUN
  NAME    VALUE    MIN     MAX      UNITS    SET    HI    HI
  T100AV            0      250*[1]   °F      180    190   205
                                 —104
    FOOTNOTES:
     *[1]   T100AV = (T100 + T101 + T102)/3
  106                                    PROGRAM LISTING
                                         RETURN TO MAIN MENU
```

```
110—TEST    C101    C102    C103    :ACTION
     112— OFF     OFF     OFF     :L100, OFF
          OFF     ON      ON      :L100, ON; L101, ON
          ON      ON      ON      :F103.SET=50
```

ICONS

T100AV REGULATE P100 HICONSTR F100 REGULATE V100 FEEDFWD F50

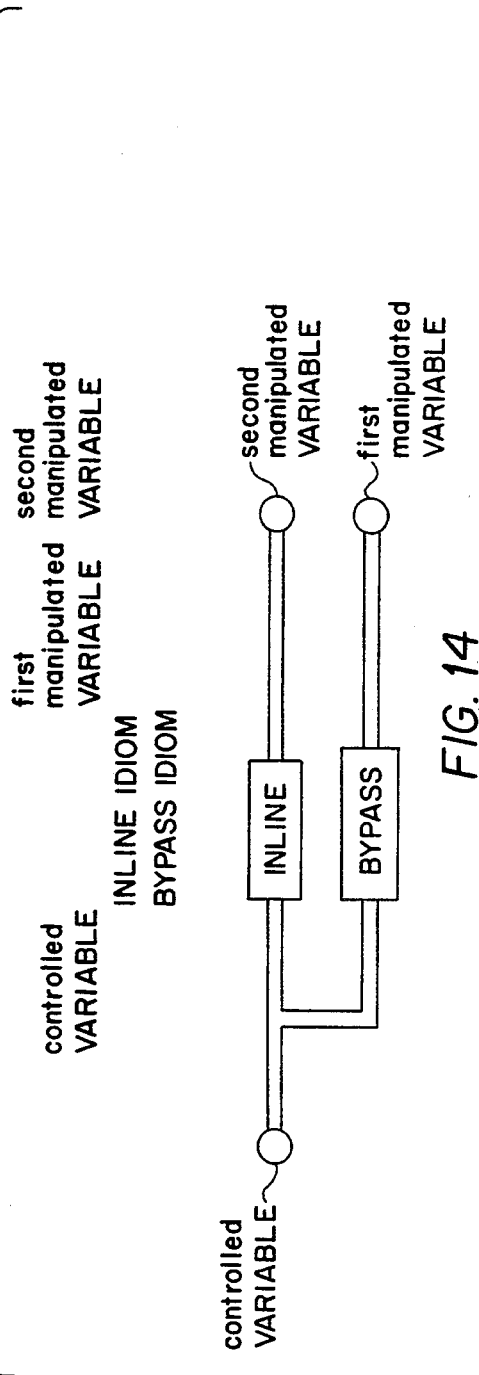
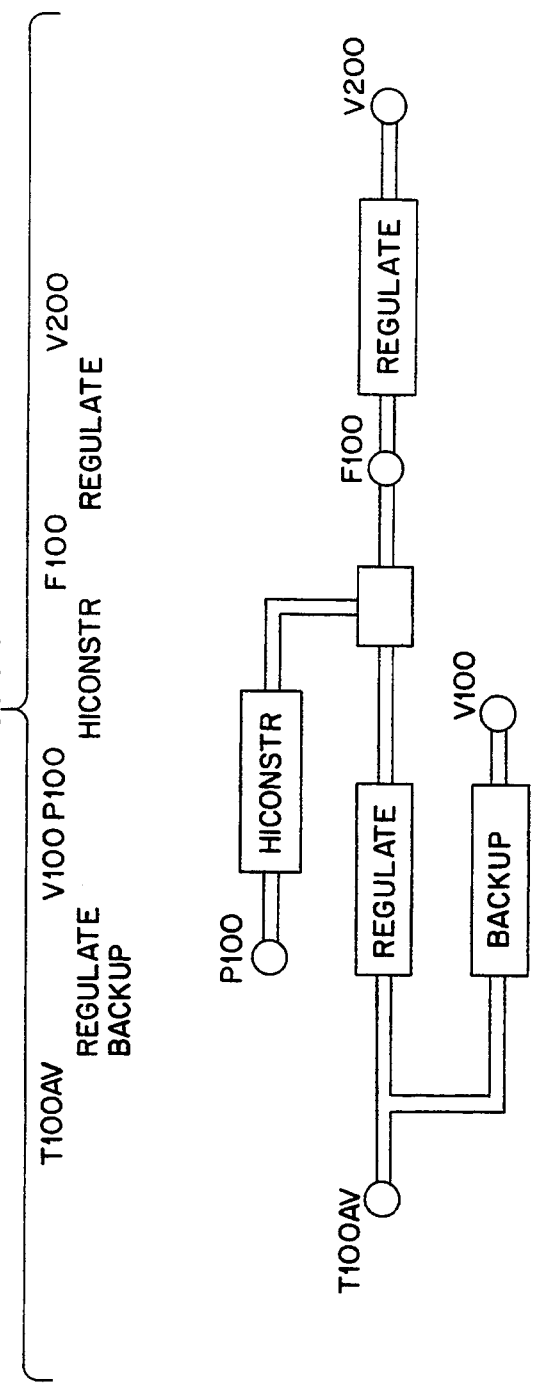

FIG. 17

BLEND: F100 F101 F102

FIG. 18

RETORT: BATCHID PRODUCT VENTTIME HEATTIME COOKTIME COOLTIME
STARTTEMP PRODTEMP COOKTEMP BULBTEMP FINALTEMP TEMP
PRESSURE OVFLVENT STEAMVALVE WATERVALVE AIRVALVE DRAINVALVE

States: RECIPE / RUNBATCH / ENDBATCH, STEW/ TUNA,

THEME STATEMENTS:
RAMP TEMP*[1]   START/FOR)VENTTIME *[2]
                HEAT ITO/COOKTEMP+BIAS IN HEATTIME MIN*[3]
170             COOK AT COOKTEMP*[4] FOR COOKTIME *[5]
                COOL TO 0*[6] IN COOLTIME *[7]      } 172

RAMP P100

*[1] VENT, OPEN;
     STEAMVALVE, OPEN
*[2] VENT, CLOSED;
     STEAMVALVE, CLOSED;
     "RECORD START BULB TEMPERATURE"LOG; BULBTEMP?LOG;TEMP LOG
*[3] "RECORD START COOK BULB TEMPERATURE"LOG; BULBTEMP?LOG;TEMP LOG;
     BIAS=0
     TEST TEMP((BULBTEMP)) TEMP(BULBTEMP-2) :ACTION
                    BOTH HI              :"ALARM; MANUAL BIAS?"LOG;
                                          BIAS?LOG
                    BOTH LO              :"RECALIBRATE RTD"LOG
     PRODTEMP=TEMP
*[4] PRODTEMP=LOSELECT(PRODTEMP, TEMP);
*[5] TEMP LOG;
     STARTPRESSURE=PRESSURE.SET
*[6] WATERVALVE=FUNCTION[STARTPRESSURE-PRESSURE.SET]

| X | Y |
|---|---|
| 0.0 | 0.0 |
| 0.5 | 0.5 |
| 0.7 | 0.9 |
| 0.8 | 1.0 |
| 0.0 | 0.0 |

*[7] DRAINVALVE, OPEN;
     ENDBATCH

FIG. 19

MC100: T100 T101 T102 T100AV TEMP F100 V100 ALARM HOLD STARTER POWER SPIN
States: MANUAL/SETUP/RUN

THEME STATEMENTS:

SEQUENCER:    START/RUN/STOP/STOPPED

| POWER | SPIN | PHASE | :ACTION |
|---|---|---|---|
|  |  | START | :"STARTING"; STARTER, START; HOLD, HOLD |
| POWERED | TURNING | START | :"RUNNING; STARTER,_; RUN |
|  |  | STOP | :"STOPPING"; HOLD, STOP; ALARM,_ |
| STOPPED | STOPPED | STOP | :"STOPPED"; HOLD, HOLD; STOPPED |
| POWERED | TURNING | RUN | :"RUNNING" |
| STOPPED | TURNING | STOP | :"ALARM"; ALARM, ALARM |
|  |  | STOP | :"ALARM"; ALARM, ALARM |

FIG. 20

MC100: T100 T101 T102 T100AV TEMP F100 V100 ALARM HOLD STARTER POWER SPIN
States: MANUAL/SETUP/RUN

THEME STATEMENTS:

TIMER:    START(10 SEC)/RUN/STOP(10 SEC)/STOPPED

| POWER | SPIN | PHASE | DELAY | :ACTION |
|---|---|---|---|---|
|  |  | START | EARLY | :"STARTING"; STARTER, START; HOLD, HOLD |
| POWERED | TURNING | START | EARLY | :"RUNNING; STARTER,_; RUN |
|  |  | STOP | EARLY | :"STOPPING"; HOLD, STOP; ALARM,_ |
| STOPPED | STOPPED | STOP | EARLY | :"STOPPED"; HOLD, HOLD; STOPPED |
| POWERED | TURNING | RUN |  | :"RUNNING" |
| STOPPED | TURNING | STOP |  | :"ALARM"; ALARM, ALARM |
|  |  | START | LATE | :"ALARM"; ALARM, ALARM |
|  |  | STOP | LATE | :"ALARM"; ALARM, ALARM |

FIG. 21

MC100: T100 T101 T102 T100AV TEMP P100 F100 V100 C100 C101 C102 C103
States: MANUAL/SETUP/RUN

THEME STATEMENTS:

STREAM    C100
    QUALITY:    GOOD/REWORK/REJECT
    STATION:    LOAD(0)/CHECK(150)/REJECT(180)/END(300)

| STATION | QUALITY | C101 | :ACTION |
|---|---|---|---|
| CHECK |  | LOW | :REWORK |
| CHECK |  | BAD | :REJECT |
| REJECT | REWORK |  | :C102, RECYCLE |
| REJECT | REJECT |  | :C102, REJECT |

System Organization

FIG. 29
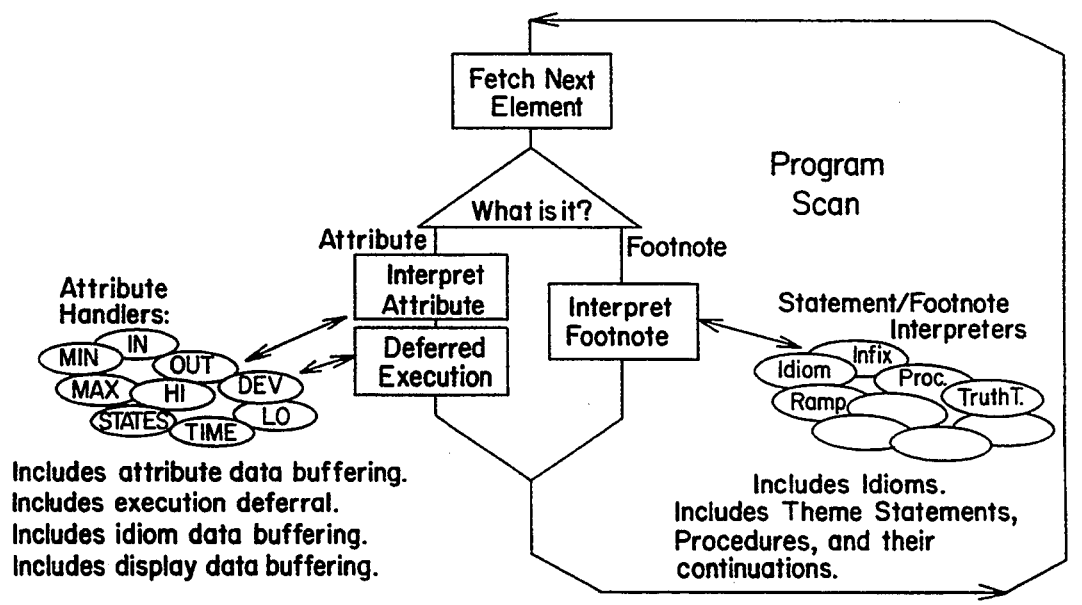
SuperVariable Program Scan
FIG. 30
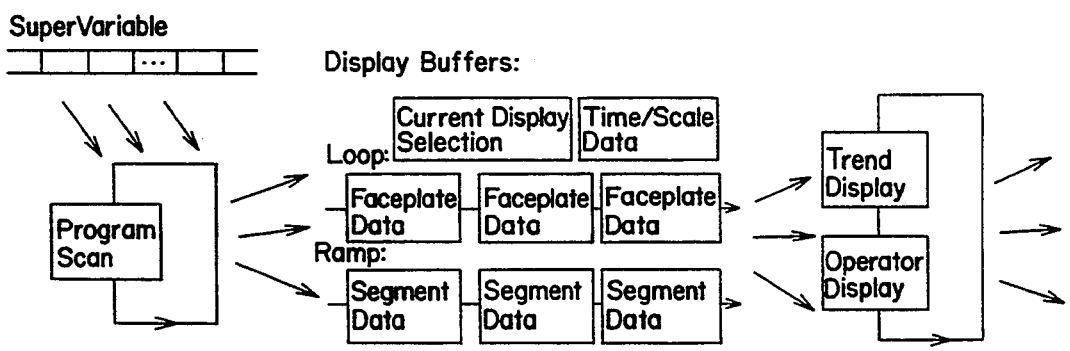
Display Data Gathering, Buffering, and Output
FIG. 31
| T100AV | P100 | F100 | V100 |
|---|---|---|---|
| REGULATE | HICONSTR | REGULATE | |

# LOCAL EQUIPMENT CONTROLLER FOR COMPUTERIZED PROCESS CONTROL APPLICATIONS UTILIZING LANGUAGE STRUCTURE TEMPLATES IN A HIERARCHICAL ORGANIZATION AND METHOD OF OPERATING THE SAME

CROSS-REFERENCE TO RELATED APPLICATIONS

This application is a continuation-in-part of my co-pending application Ser. No. 07/344,492, filed Apr. 26, 1989, which is in turn a continuation of Ser. No. 07/165,190, filed Mar. 7, 1988, now abandoned, which in turn is a continuation of Ser. No. 06/785,575, filed Oct. 8, 1985, now U.S. Pat. No. 4,736,320, issued Apr. 5, 1988, the specifications of which are hereby incorporated by reference.

BACKGROUND OF THE INVENTION

1. Field of the Invention

The present invention relates generally to the field of computer-controlled process equipment controllers, as well as to the field of control systems. More particularly, the present invention relates to an apparatus and method (i.e., an applications-oriented computer language structure and translator therefor, such as an interpreter or compiler) for developing, describing, and implementing process control of a single process device which participates in batch or continuous industrial process control. The local equipment controller and program for operating the same is generally used in a stand alone configuration wherein the controller directly controls a single vessel processing unit. The method of operating the local equipment controller accommodates the writing of programs in terms of self-documenting statements of control objectives or intentions.

2. Discussion of the Related Art

The present invention has broad application in a wide range of computer-driven control applications and analogous environments. Its virtues and operation will best be understood if it is described in the context of a specific type of control system, rather than in the abstract. For convenience, the context for explanatory purposes will be the field of industrial process control; it should be appreciated, however, that this is simply an exemplary context and is not limiting of the invention.

Industrial process control, as that term is used herein, refers to the control of manufacturing processes in industries wherein a product is, in at least some significant stage of production, a homogeneous fluid capable of being flowed in pipes or a stream of particles capable of being moved by a conveyor belt. The product can be operated upon by simple actuators such as valves, baffles and deflectors and its state can be determined (or at least estimated) by simple probing and sampling sensors. Typical industries included within this framework are those which manufacture petroleum products, chemicals, power, paper, films, metals, textiles, plastics, foods, drugs, cement, and, increasingly, semiconductors.

Industrial processing systems, such as systems for preparing chemical compounds and for controlling other complex operations, frequently implement lengthy and highly detailed procedures. These procedures may involve hundreds, or even thousands, of steps in which various process parameters are monitored and selected process variables are controlled in predefined functional relationships which depend on the monitored parameters. The process variables may be changed continuously or at discrete time intervals. Frequently, the control of such steps involves monitoring one or more measurements and initiating an action or setting a parameter (for example, process variables such as a temperature, pressure, composition, rate of change, amount of change, or the like) in response to the value or condition of the monitored measurement. Additionally, such procedures determine and control when individual processing steps are initiated as well as when they are terminated. Many of these steps typically must be performed in an established temporal relationship relative to one or more other steps. That is, step "x" is begun only after step "y" has been completed, or some predefined interval before or after step "y"; or steps "x" and "y" are carried out concurrently.

There are many ways in which industrial process control systems can be categorized or classified. One of the most basic categorizations groups systems into so-called "batch control" systems (or processes) and so-called "continuous control" systems. In continuous processes in large industrial processing systems, production material is flowed through a series of processing units in such a way that each unit performs a logically independent production step. Control of a continuous process constitutes a continuous computation of the necessary process variables. In batch processing, by contrast, the production material is placed in a vessel (the processing unit) with various pieces of support equipment. That equipment may perform multiple production steps, such as heating, cooling, and pressurizing the vessel. A batch process may carry out all production by itself or it may be arranged in a production line with other batch processes or with continuous units. Batch processing units and continuous processing units themselves may be termed single vessel processing units. Within this specification, the term single vessel processing unit refers to a single processing station, which may be free standing, for accomplishing a particular predetermined processing task or series of tasks. The single vessel processing unit may receive material input from a previous single vessel processing unit and may send its output onto another single vessel processing unit. Large process control systems may be built up from a number of single vessel processing units. An example of a single vessel processing unit might be a retort or a dyebeck.

In some situations, an entire processing complex may occupy more than one square mile. With such a large facility, organization has a significant effect on efficiency. A processing complex typically may be organized into a hierarchy of (from bottom to top) units, processes, and plants. At the lowest levels, the elements may be integrated in an appropriate manner governed by the requirement of meeting the detailed stoichiometric requirements involved in producing a given product. At higher levels, processing may be more flexibly arranged and rearranged to respond to the needs of the business (e.g., to take advantage of the processing units which happen to be available at the time there is a desire to manufacture a given product). The present invention, which is explained below, addresses the lower levels, where there is a desire for a highly integrated automation of control processing; it is well-suited to batch control and continuous control systems which use single vessel processing units. The scheduling and rearrangement of the higher level processing resources is the role of process management, not process control, and is therefore outside the scope of this invention.

In batch processing, the sequencing of the production procedure is divided hierarchically into various levels of operation. The divisions are made generally along the lines of stages of production, operator intervention and monitoring. This facilitates the use of a plant for producing a variety of products. The physical plant resources may be shared so that these products may be produced at different times while using some or all of the same production equipment, either by rearranging the processing or by using the same procedure but varying parameters to yield a different grade of product.

Control automation in this environment must provide a method for imposing control procedures in a relatively simple form.

It is also highly desirable that the control automation process automate the record-keeping associated with the production of each lot, based on the control parameterization and sources of raw materials used therefor; this is important since there is often a need or desire, at some later time, to be able to identify the source of particular characteristics in a product. Further, the record keeping system should have the capability of displaying the recorded data in a variety of different formats, such as bar graphs and line graphs so that trends in process variables or product characteristics can be identified and corrected, if necessary.

Further, a given industrial process may have to be adjusted or changed from time to time—for example, to accommodate a substitution of raw materials or to make an improvement to the product. It is therefore important that the users of a computer-controlled single vessel processing unit be able to identify the portions (and the specific instructions) of the control program which require revision. In the past, these requirements have given rise to a frequently-unfulfilled need for extensive documenting of such programs, parameters, and materials. This level of documentation is only achieved at considerable expense. And undocumented changes could be difficult to detect and analyze.

Various computer languages have been used in the past for developing and implementing process control procedures for both large complex processing systems and single vessel type processing units. Until recently, these languages have included only general purpose computer languages such as FORTRAN, BASIC, PASCAL, C, and other high-level textually-oriented programming languages, as well as specially adapted variants of such languages. Other special purpose languages used for process control applications have included table-based representations of graphic features such as block diagrams and ladder diagrams, either by themselves or in conjunction with textual language features. Only the information contained in the internal table-based representation of the graphic feature has command significance. Moreover, most such prior languages share certain characteristics. For example, they typically require the user to follow a rigid control format using a general purpose instruction set. Further, they provide at best an awkward connection between control functions and the processing objectives which motivate them. These drawbacks are often the result of trying to employ a highly generalized and highly structured language which is implementation oriented instead of being intention oriented. That is, the instruction sets of those prior application or general purpose languages typically emphasize the implementation of an operation as a series of computational instructions, whereas the control system designer is concerned with what he is seeking to accomplish (i.e., his intentions). Consequently, the control system designer, though he is generally not interested in the details of how the machine implements each control operation, is forced to become a computer programmer. Many of the errors introduced in system control programs are believed to be the result of the constant need for mental translation which this regime imposes on the designer.

To make general purpose computer languages more useful in process control, attempts have been made to develop programming strategies to minimize the translation effort. The most obvious of these strategies is the use of subroutines. Subroutines, however, are of only limited benefit. They help when the subroutine requires only a few arguments which act only once each time the subroutine is called. When there are many arguments which must be passed between the main program and the subroutine, though, the subroutine call becomes confusing and the order and meaning of its arguments becomes difficult to remember. Further, it can be an onerous task to link up every argument; and the format is made even more awkward when any of the arguments is optional.

Ambiguity is also a problem in most general purpose programming languages. For example, the expression I=1 could represent a direct calculation, a flag setting, a loop initialization, or some other operation. By contrast, application functions are not likely to be this general.

Another result of the conflict between the application orientation of the control system designer and the implementation orientation of existing application or general purpose programming languages is that control programs written in such languages require an extensive documentation effort, if they are to be intelligible to future users and are to be capable of being modified from time to time. The documentation activity typically is two-fold. First, the source code for the program must be supported with extensive textual comments. Second, a written manual or the like must be prepared to explain the logical organization and features of the program, nomenclature of variables and labels, and other appropriate information. Consequently, each time the program is modified, the comments in the source code must be revised and the manual must be updated. With a program which is being used and modified by a number of people, the support effort needed to maintain up to date documentation is substantial.

A solution to the above described problems was disclosed in U.S. Pat. No. 4,736,320. In that patent, there was described a novel language structure and translator; that is, a new method of operating and programming a computer system thus controlled. The statements employed in this language structure are action-oriented and are specifically adapted for use in constructing process control programs. From these control-oriented statements, appropriate program code may be generated for operation of a computer to implement the desired control functions.

In its most complete implementation, this language structure exhibits the following characteristics: (1) it organizes the control system into logically distinct application subsystems according to processing and control activities; (2) it provides distinct representations for logically different control activities; (3) it orders the display of configured data to make it predictable and easy to read and understand; (4) it represents and displays the program structure graphically, in a way which guides the eye to and through critical relationships; (5) it employs command statements which define precise application function roles, to reduce ambiguity in the underlying intent and in the relationship between the functional elements of a control program; and (6) it uses logical and/or standard application functions and practices to account for implied configuration activities.

Graphical symbols, or icons, are employed to draw the eye to critical features in the control program and to lead the eye through critical interrelationships among the several commands of a complicated control system. At the same time, the translator treats these icons as statements (i.e., commands) which define the relationships among other associated program statements (which are usually textual commands). While prior languages designed for development of documentation have used somewhat similar graphical symbol systems to make the documentation more readable, those graphical symbols have been only passive in nature and have not also served as command statements. Thus, the language structure described in the '320 patent uses as commands a mixture of textual statements and graphic symbols.

Although the approach of the '320 patent represents an improvement over the prior art, for simple applications, the high degree of flexibility and generalization in that language occasionally makes programming tasks more complicated than is necessary when controlling a single vessel processing unit, such as a retort or dyebeck.

In many single vessel process control applications, wherein the control and production system is relatively simple, and also in applications in which the operation of a simple control and production system is largely separated from other units under the control of a single human operator, the number of parameters and variables that need to be controlled is relatively small, and therefore a subset or simplified instruction set of the computer language described in the '320 patent would suffice. Although the subset language may have less flexibility in some applications, it can be implemented more simply, resulting in greater overall efficiency by simplifying the required processing overhead.

Therefore, an object of the present invention is to provide a local equipment controller and method for operating the same, which method includes a subset or simplified instruction set of the computer language described in the '320 patent.

Another object of the present invention is to provide a computer language structure and local equipment controller using the same wherein the language structure allows a control system designer to program in terms of the control functions he desires to implement, rather than in terms of the computer's internal details.

Another object of the present invention is to provide a computer language structure for use in developing programs to control local equipment controllers, such that the control programs are largely self-documenting.

Another object of the present invention is to provide a computer language structure in which the temporal relationships between controlled processes are readily apparent to a reader of a program listing.

Another object of the present invention is to provide a data structure for a programming environment in which supporting details for carrying out control operations are segregated from expressions of control intentions, so as to enhance representation of the control intentions.

Another object of the present invention is to provide a data structure that provides for reduced processing overhead during execution, and provides for certainty and simplicity of execution.

Another object of the present invention is to provide a local equipment controller having a predefined set of control solutions for controlling a variety of processes supplied therewith.

Another object of the present invention is to provide a programming format that is fixed so that control intentions and understanding of program control is enhanced.

Another object of the present invention is to provide a user interface in a local equipment controller which user interface provides an operator user interface and a programming user interface wherein the user interface makes use of graphic features which have command significance.

SUMMARY OF THE INVENTION

The foregoing and other objects and advantages of the present invention are achieved in a computer-controlled equipment controller for controlling industrial process control equipment which uses a language structure and translator specifically adapted for use in constructing computer programs for controlling chemical and physical processing. The novel method of operating and programming the computer includes language structures which reflect the control engineer's objectives in an idiomatic fashion. The database upon which the language structure of the present invention operates is implemented as a single, contiguous memory segment which is scanned during each sample time to provide for regularity of program execution in combination with reduced processing overhead. The language structure of the invention is based on a three-level hierarchy of control function with sequencing and coordination at the highest level, continuous loop control at the middle level, and process I/O point operation at the lowest level. In the context of control of a single device processing unit, the language structure of the present invention is designed to reflect a simple structured approach based on fairly standardized higher level sequenced or coordinated control of lower level continuous controls. The consistency of such a structure allows a simpler program and equally structured operating displays.

The foregoing and other objects, features and advantages of the present invention will be more readily understood and apparent from the following detailed description of the invention, which should be read in conjunction with the accompanying drawings, and from the claims which are appended at the end of the detailed description.

BRIEF DESCRIPTION OF THE DRAWINGS

In the drawing:

FIGS. 2A, 2B, 2C and 2D, illustrates an exemplary program listing which may be written by a control engineer using the language structure of the present invention to operate the hardware embodiment illustrated in FIG. 1;

Figure 15:
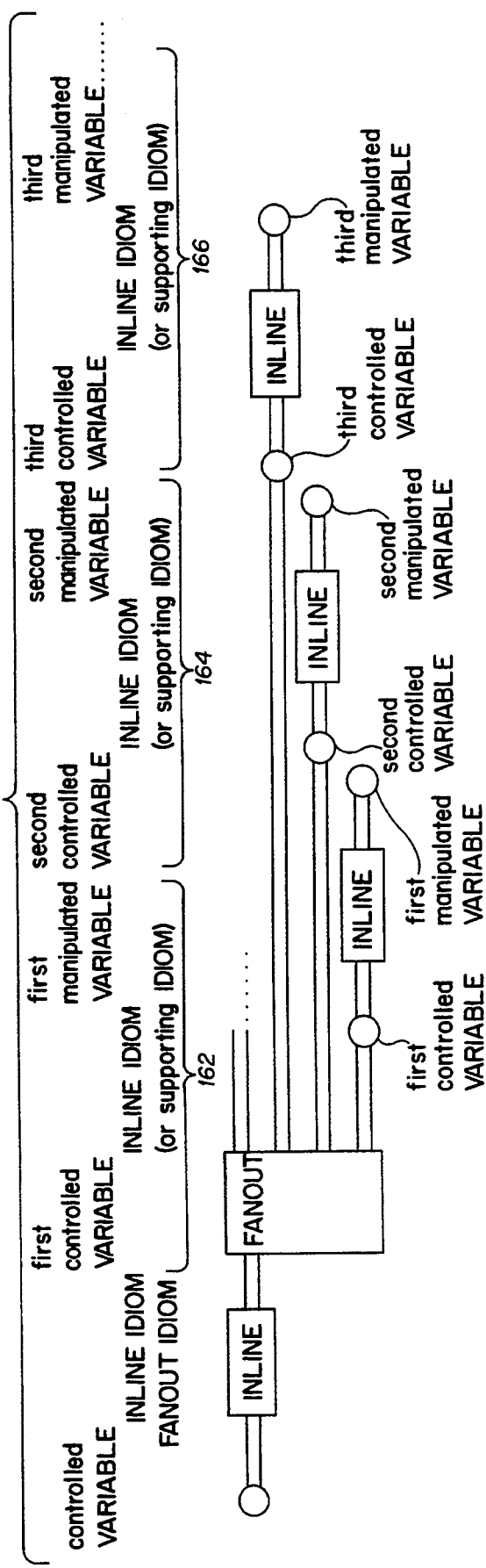
Figure 16:
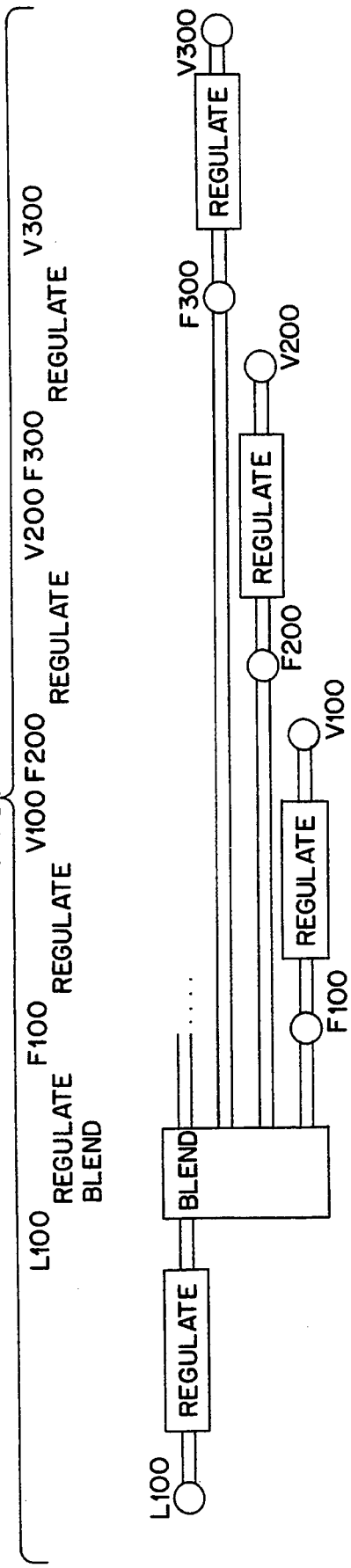

FIG, 12 illustrates an example of the override LOOP STATEMENT language structure;

FIG. 13 illustrates the general form of a bypass LOOP STATEMENT EXPRESSION language structure as it modifies an inline LOOP STATEMENT EXPRESSION;

FIG. 14 illustrates an example of the bypass LOOP STATEMENT language structure;

FIG. 15 illustrates the general form of a fanout LOOP STATEMENT EXPRESSION language structure as it modifies an inline LOOP STATEMENT EXPRESSION;

FIG. 16 illustrates an example of the fanout LOOP STATEMENT language structure;

FIG. 17 illustrates an example of a blend THEME STATEMENT language structure;

FIG. 18 illustrates an example of a ramp THEME STATEMENT language structure

Figure 22:
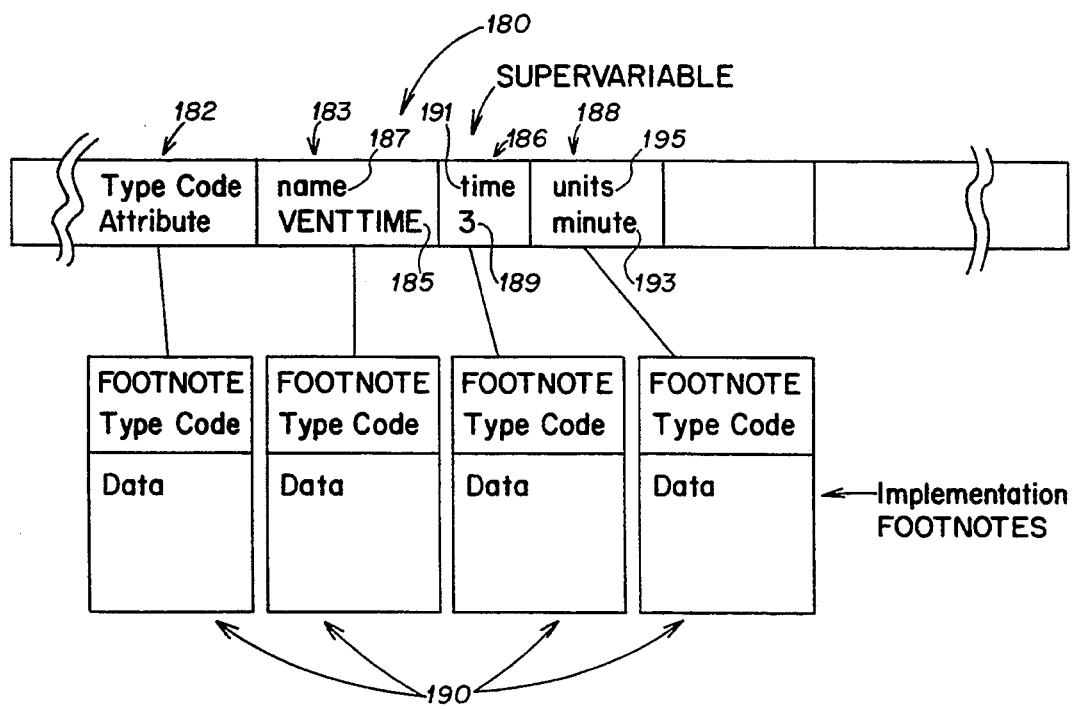
Figure 23:
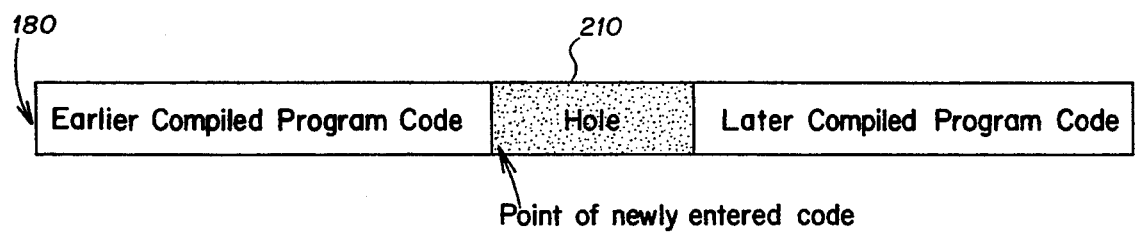
Figure 24:
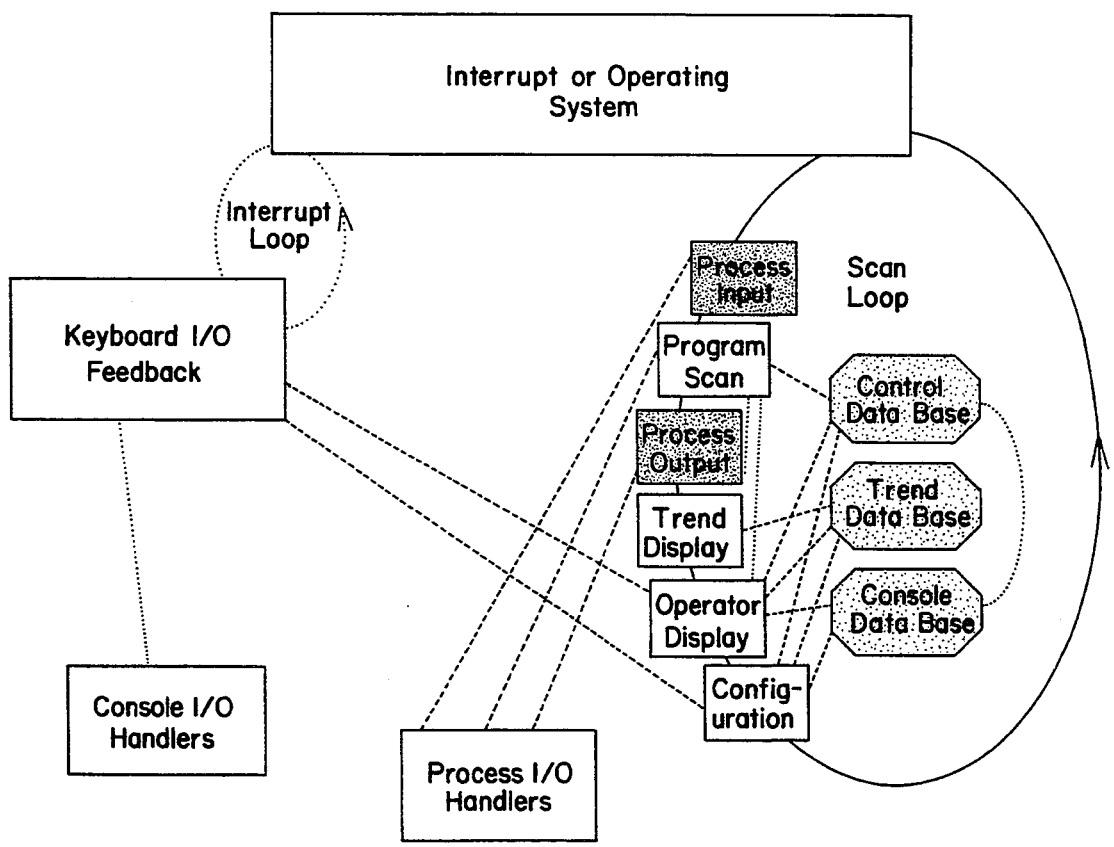
Figure 25:
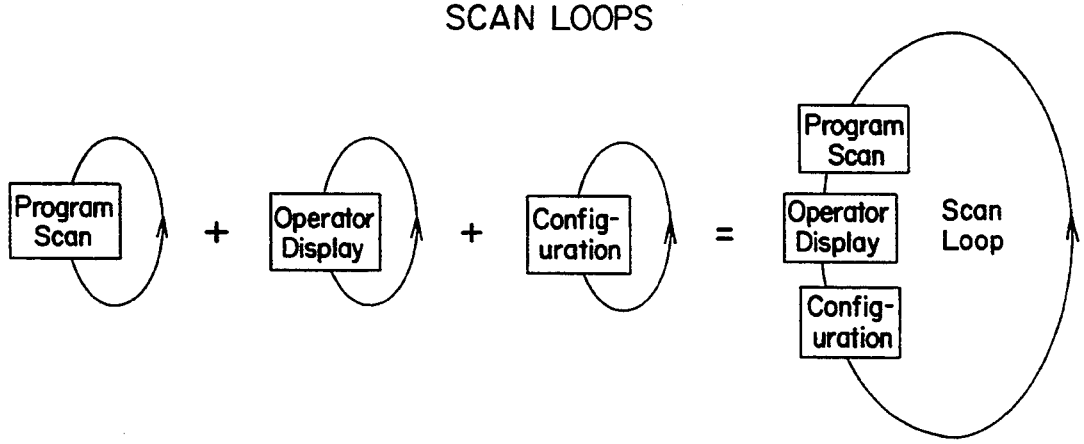
Figure 26:
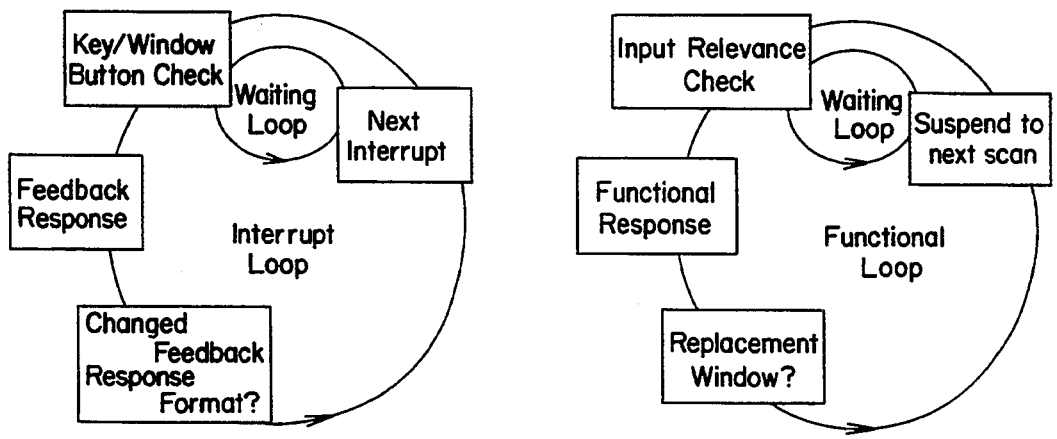
Figure 27:
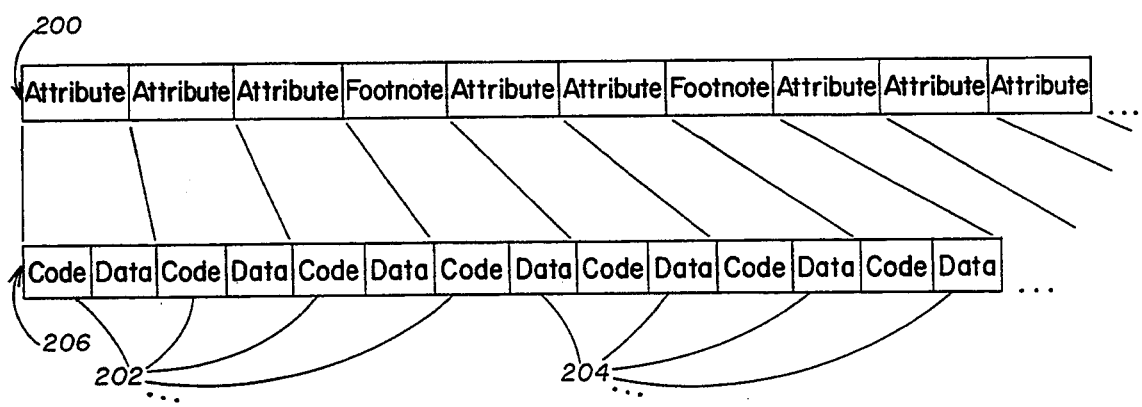
Figure 28:
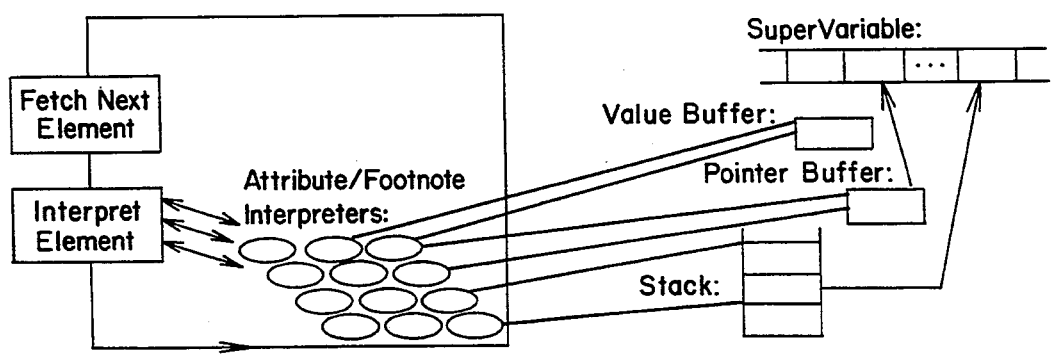
Figure 32:
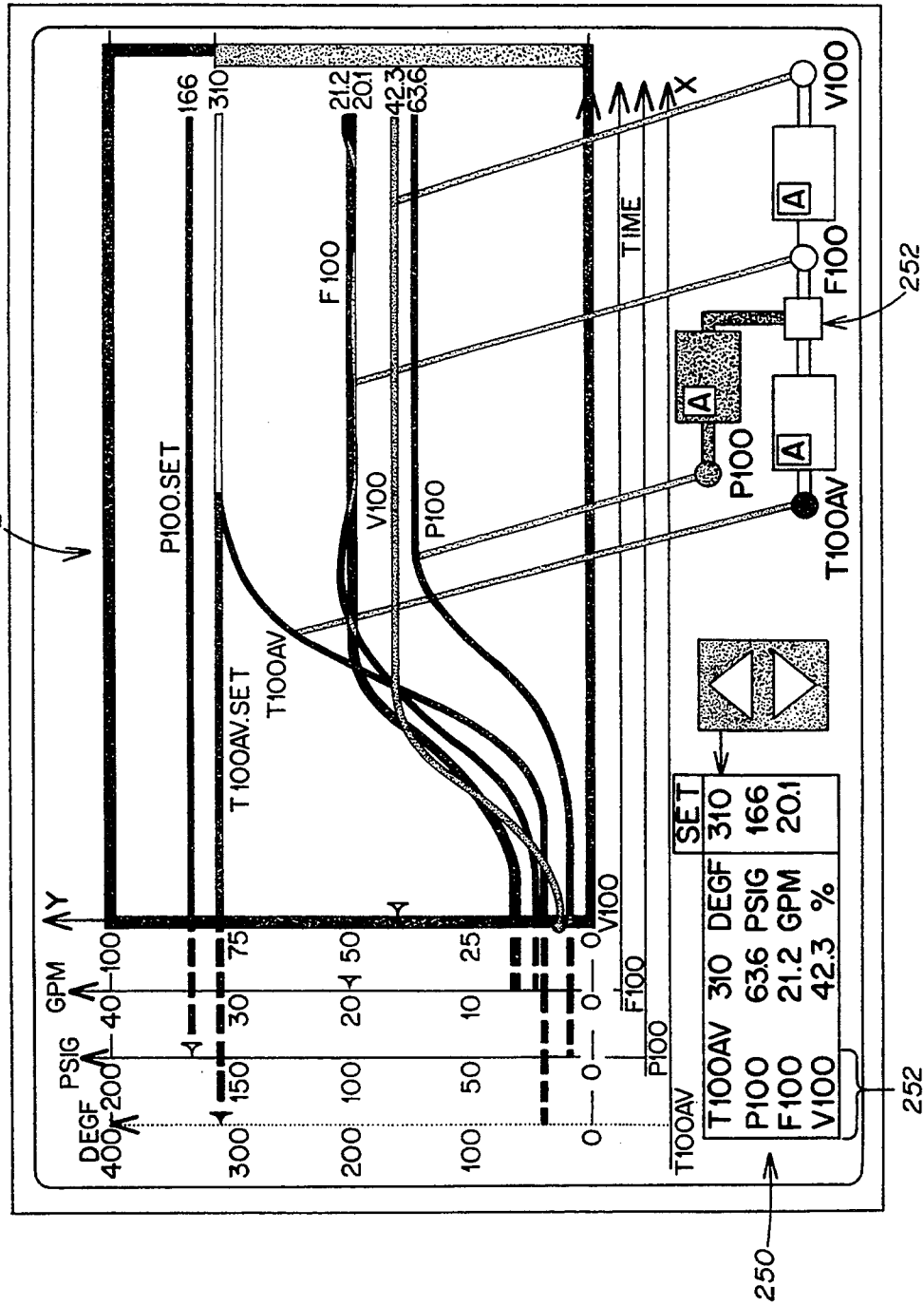

FIG. 19 illustrates an example of sequencer THEME STATEMENT language structure;

FIG. 20 illustrates an example of a timer THEME STATEMENT language structure;

FIG. 21 illustrates an example of stream THEME STATEMENT language structure;

FIG. 22 illustrates the data structure of a SUPERVARIABLE database used to support the language structures of the present invention;

FIG. 23 illustrates a memory management scheme used in the present invention;

FIG. 24 illustrates the overall program system organization of the present invention including a flow chart showing repetitive processing loops;

FIG. 25 includes flow charts illustrating the concept of scan loops used in the system organization illustrated in FIG. 23;

FIG. 26 includes flow charts illustrating the concept of human user interface loops used in the interrupt loops illustrated in the system organization of FIG. 23;

FIG. 27 illustrates a compiled version of the SUPERVARIABLE database illustrated in FIG. 22;

FIG. 28 illustrates the overall concept of a SUPERVARIABLE program scan and buffering required to implement the program scan;

FIG. 29 includes a flow chart illustrating in more detail the SUPERVARIABLE program scan of FIG. 28;

FIG. 30 illustrates an example of display data gathering, buffering, and display of data stored in the SUPERVARIABLE format illustrated in FIGS. 22, 28, and 29;

FIG. 31 illustrates a LOOP STATEMENT to be processed for display by the methods illustrated in FIG. 30; and FIG. 32 illustrates an exemplary trend display of the LOOP STATEMENT of FIG. 31 which may be generated using the processing illustrated in FIGS. 23-30.

DETAILED DESCRIPTION

In the following description, extensive use will be made of terms having defined meanings. A convention has therefore been adopted to distinguish the use of such terms in their specially defined contexts from their use as terms having ordinary dictionary meanings. According to this convention, all terms defined as objects in this object-oriented language structure will be displayed in upper case block letters, and all terms defined as concepts will be displayed in upper case italics. Some terms will appear as both objects and as concepts. Throughout this specification, the term "object" is meant to describe a structure which includes the definitions of the object and the operations which may be carried out with that object (i.e., an object is a collection of data and methods).

The present invention includes a computer-controlled process controller designed to control a single vessel processing unit. The present invention is contemplated as being directly connected to and controlling a particular single vessel processing unit. The process controller of the present invention, for most applications, will be locally configured for control of the single vessel processing unit to which it is attached (i.e., a "local" equipment process controller). However. The present invention is not so limited. With suitable communications hardware and software, multiple local equipment controllers of the present invention may be connected together in order to form a larger process control system. For example, the multiple local equipment controllers may be controlled by a single central process controller which maintains systemwide control and management of an overall production system. For ease of description, however, the present invention will be explained using a single local equipment controller controlling a single vessel processing unit.

Figure 1:
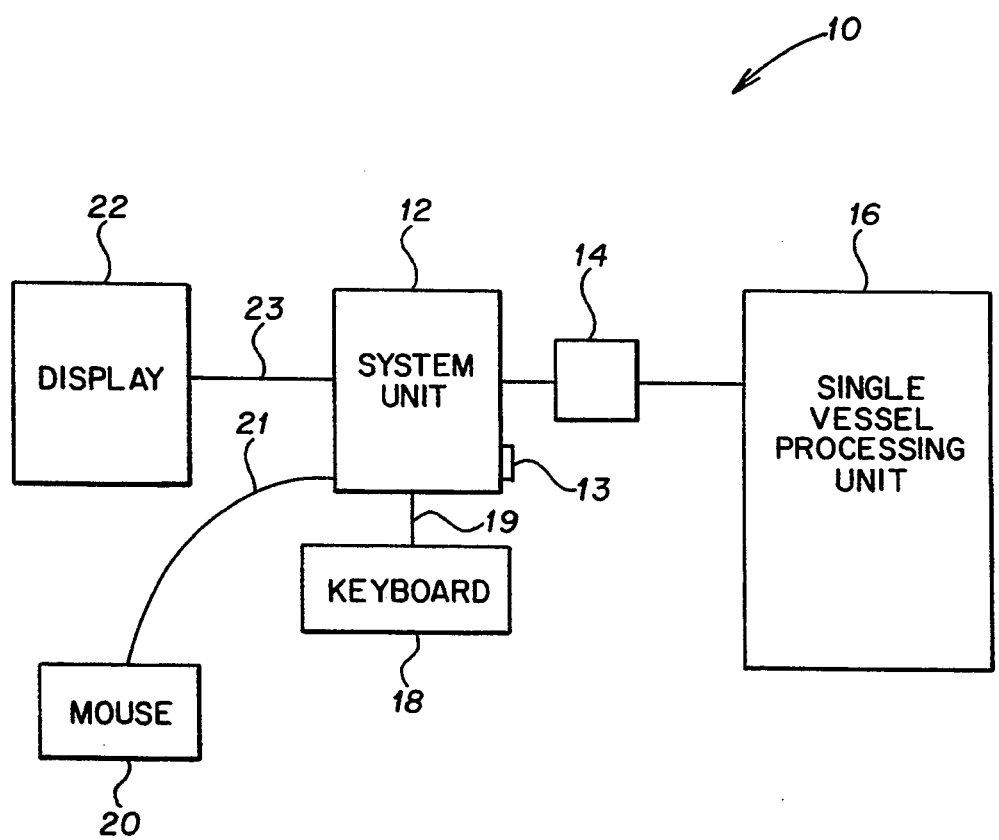
FIG. 1 illustrates one example of a hardware embodiment of the present invention.

Reference is now made to FIG. 1, which figure illustrates one example of a hardware embodiment of the present invention. The local equipment controller 10 includes a computer system unit 12 having at least a central processing unit and associated memory along with any required input/output devices, mass storage devices, and so on. The system unit 12 may be a general purpose computer capable of being programmed according to the method of the present invention. The system unit 12 may also include suitable communications hardware and software to enable multiple process controllers to be connected together via communications port 13 to form a larger process control system. The system unit 12 is connected by a suitable process I/O hardware and software represented by block 14 to the single vessel processing unit 16 which may be, for example, a dyebeck or a retort. Operator commands and programming commands are input into the system unit 12 via a keyboard 18 or by input device 20 which may be a mouse, track ball, or other suitable device over communications links 19 and 21, respectively. The local equipment controller of the present invention additionally includes a display device 22 which may be any suitable display device such as a CRT, liquid crystal display, and so on which receives display data and/or commands over communications link 23. The method of operating and programming the local equipment controller of the present invention will now be explained. One skilled in the art will appreciate that the following explanation is meant as exemplary and not limiting. There may be other implementations of the method of the present invention which are clearly included in the broad concept of the invention.

The method of the present invention involves a method of operating a computer which method is a further refinement of the computer language structure described in the '320 patent. In the present method, several refinements have been made to the computer language structure described in the '320 patent. In addition, several simplifications of the language have been made for purposes of reducing the implementation effort required. Further, a novel language structure and supporting data structure, the SUPERVARIABLE, is utilized to provide for regularity of program execution in combination with reduced processing overhead. Additionally, a menu-organized user interface may be provided to guide the control engineer and the system operator through the steps required to configure or run the local equipment controller.

The computer language of the present invention is described in its most general form in the '320 patent. The language described in the '320 patent may be termed an "Idiomatic Control Language". The language is referred to as "idiomatic" because the language itself is designed to reflect the control system designer's intentions in an idiomatic fashion. The present invention is a subset or simplification (meaning a simplified instruction set) of the more general language and may be referred to as the "Idiomatic Control Language Subset". The Idiomatic Control Language Subset is based on a three level hierarchy of control function with sequencing and coordination at the highest level, continuous loop control (as normally implemented in terms of regulatory, feedback control, block diagrams, and their digital function block representation equivalents) at the middle level, and process I/O point operation at the lowest level. There are five basic language structures (and supporting data structures) provided in the present invention which give effect to the control system designer's intentions. Within this specification, the term language structure is meant to refer to general elements of a language subject to their own formal syntax definition specifying a particular class of command sequence. These basic language structures are SUPERVARIABLEs, LOOP STATEMENTs, THEME STATEMENTs, PROCEDUREs, and FOOTNOTEs.

A SUPERVARIABLE is both a language structure and an implementation device (in the form of a data structure). A SUPERVARIABLE provides the lowest level of control function in the hierarchy. A SUPERVARIABLE represents a variable supported with an arbitrary list of associated attributes, and includes the ability to represent several distinct variables in a single data structure (e.g., to concatenate variables). The attributes are specified in a format which defines the sequence of types of the attributes. As a language structure, the SUPERVARIABLE takes the form of a free form list of attributes, defined by the control engineer.

The data structure supporting the SUPERVARIABLE forms the basic implementation vehicle for the local equipment controller computer program. When interpreted or compiled, a single SUPERVARIABLE structure is constructed wherein the entire program is translated into a string of type codes each with associated data. A process variable is defined as a segment of the SUPERVARIABLE which starts with one or more consecutive variable name attributes and includes no other internal variable name attributes. During compilation and execution of the program, the SUPERVARIABLE provides for a fixed order of execution for the program.

A LOOP STATEMENT occupies the middle level in the language hierarchy. A LOOP STATEMENT implements control of a single, measured, process VARIABLE (the "controlled" VARIABLE) through manipulation of one or more manipulated or actuator variables (the "manipulated" VARIABLEs). A LOOP STATEMENT may also include feed forward and constraint functions applied to other related measurements for associating a detailed computation with the higher level language structures. The LOOP STATEMENT replaces the computationally oriented function block of conventional practice, expressing control intentions and loop level integration. Specifically, the LOOP STATEMENT replaces the IDIOM SPACE of the '320 patent to provide a more simply structured approach for controlling a single vessel processing unit.

A THEME STATEMENT occupies the highest level in the language hierarchy. A THEME STATEMENT is the highest level of operationally visible sequenced or coordinated control, which describes a predefined control solution for a typical control problem, such as commonly encountered batch, sequence, or continuous control problems. THEME STATEMENTs are based on pre-defined templates for a particular type of control task. Specific THEME STATEMENT formats may be provided which address specific control requirements. THEME STATEMENTs allow automation of part of the control system required for batch and/or continuous control.

PROCEDUREs are bracketed sequences of general computational statements and other elements, treated as a unit, which describe less well structured activities needed to support the operation of the single vessel processing unit. A PROCEDURE is a catch-all computing function which may be used to control coordinating aspects of the single vessel processing unit which are not directly supported by any of the lower level, more formal language structures or operationally linked to displays, such as recipe set up and operational control of the background conditions of program execution.

A FOOTNOTE is a device which allows arbitrary, detailed calculations to be associated with other language elements. FOOTNOTEs are used specifically in two ways in the present invention, although clearly, the FOOTNOTE as a structure is not so limited.

First, a FOOTNOTE is a language structure used to associate a detailed computation with some higher level language element. For example, FOOTNOTEs may be used to associate detailed calculations with attributes of the SUPERVARIABLE and THEME STATEMENTs. When used in conjunction with the general control language structure described in the '320 patent, the FOOTNOTE provides a mechanism for defining arbitrary, detailed, computational refinements within a more systematic higher level language structure. Second, the FOOTNOTE is also the implementation device for expressing and implementing all computations within the SUPERVARIABLE structure.

Each of these basic language structures and others used in the present invention will be explained in greater detail hereinafter.

The present invention comprehends a computer programming language, but it is also an application system and environment. It includes, as a language, all aspects of the control application programming and configuration, and all aspects of the operation from the configured controls. The present invention integrates control language and operation. The operational displays are derived from and integrated with the configured controls. Operational displays are therefore part of the computer language and the appearance and organization of the displays has command significance.

Figure 2A:
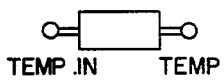
Figure 2B:
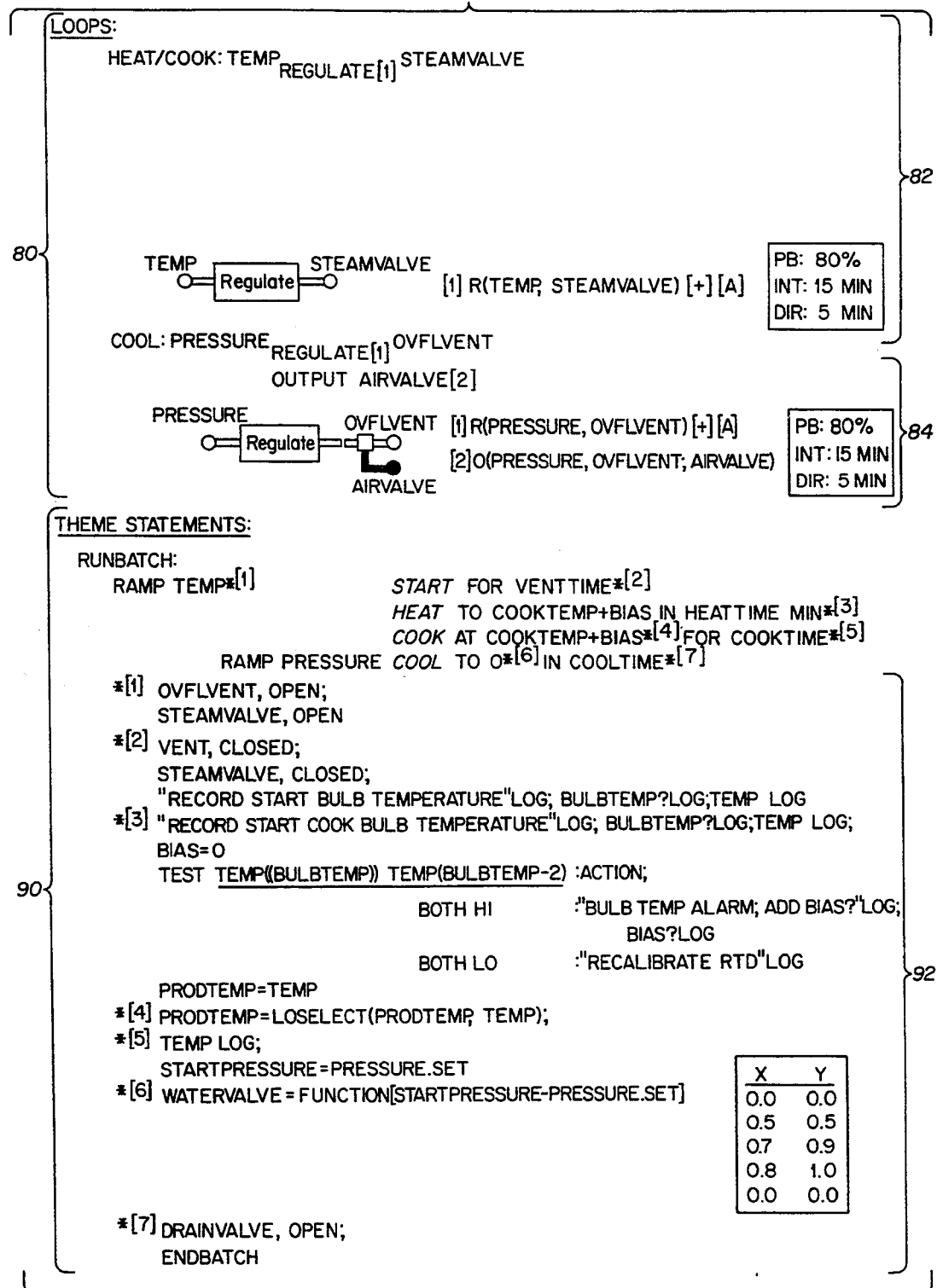
Figure 2D:
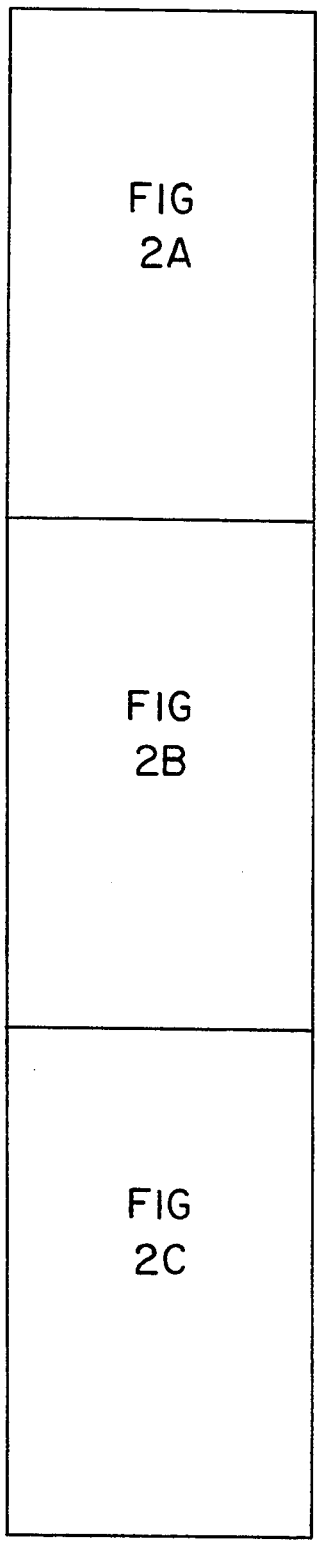

Reference is now made to FIG. 2, which figure illustrates an exemplary application program listing of the present invention which is brought up on display 22 by an appropriate selection of keystrokes or menu choices. The format of the application listing has control significance as well as presenting the control system program to the control system engineer in a manner that reflects the control engineer's intentions and allows operation of the system to be readily visualized from the control program listing.

Referring more specifically to FIG. 2, there is shown an application program listing of a control program that may be used to control a canning retort. The program listing is divided into paragraphs which assist the control engineer in visualizing program operation. The system automatically formats and orders the paragraphs as will be explained in greater detail. An appropriate sequence of keystrokes or menu selections is provided to allow the control engineer to enter and edit the data in the program.

A first paragraph 30 contains the APPLICATION HEADING. The APPLICATION HEADING is generated by the system and repeated at the top of each listing continuation page (or each display screen) and lists the system and VARIABLE names. Repetition assists the control engineer with remembering VARIABLE names and system STATEs. In the program of FIG. 2, the system name is RETORT, shown at 32. Columns 34, 36, 38, 40, 42, and 44 contain VARIABLE names assigned by the user. The user also assigns the system STATEs 46. STATEs are used to control and coordinate execution of state-dependent portions of the application program. The "/" between system STATEs indicates that the particular STATEs are mutually exclusive within a particular group of substates and the "," separates each group of substates making up the STATE. In addition to the user-defined STATEs, certain STATEs are derived from the THEME STATEMENTs and there are basic built-in system states that provide fall-back control over the whole system, particularly in case of application program failure.

The next paragraph of the program listing includes the VARIABLE DEFINITIONs paragraph 50. The VARIABLE DEFINITIONs paragraph of the program listing includes VARIABLEs having user defined names and attributes.

The next paragraph of the program listing is the FOOTNOTEs paragraph 60. FOOTNOTEs, as a language structure, incorporate the specific required general calculations to be performed in support of control of a particular VARIABLE.

The next paragraph of the program listing is the FILTERS/COMPENSATIONs paragraph 70. This paragraph provides for entry of dynamic filtering, compensations, and their parameters.

The next paragraph of the program listing is the LOOP STATEMENTs paragraph, 80. The LOOP STATEMENTs paragraph provides a listing OF THE LOOP STATEMENTs in the program, such as the Heat/Cook LOOP STATEMENT 82 and the Cool LOOP STATEMENT 84 with their tuning parameters.

The next paragraph of the program listing is the THEME STATEMENTs paragraph 90. As illustrated at portion 92 in FIG. 2, THEME STATEMENTs may include their own FOOTNOTEs describing detailed calculations and assignments necessary to effect control.

The next paragraph of the program listing is the PROCEDUREs paragraph 100. PROCEDUREs describe all of the residual functions necessary to run a particular operation. The operation of PROCEDUREs is explained in more detail in the '320 patent, and the present invention makes use of PROCEDUREs in the same manner.

The program listing is expressed in the reverse order of the hierarchy of the program objects. The basic process data and calculations are defined first in the VARIABLE DEFINITIONs and FOOTNOTEs paragraphs, respectively. Using that data, the control loops are defined onto that data in the LOOP STATEMENTs paragraph. The THEME STATEMENTs are defined after the LOOP STATEMENTs in the THEME STATEMENTs paragraph. Finally, any PROCEDUREs are defined in the PROCEDUREs paragraph to carry out any indirect overall coordination needed among the program paragraphs that have been previously defined.

The standard organization of the program listing provides an immediate visual indication to the control engineer of the function and operation of the control program. The statements used in the program, because of their idiomatic nature, immediately convey their functions to the engineer. In addition, the organization of the program itself in a reverse hierarchy helps the control engineer to visualize the system operation without requiring extensive additional documentation.

The configuration of each of the paragraphs of the control program and the associated data structures generated during compilation of the program will now be explained.

The VARIABLE DEFINITIONs paragraph 50 corresponds to the DEFINITIONS PAGE in the '320 system. A VARIABLE is defined by supplying a name and a list of attributes through an appropriate combination of keystrokes or menu selections. A particular VARIABLE may have multiple attributes. For example, the VARIABLE temp (at 52 in FIG. 2) in DEFINITIONs paragraph 50 has a number of attributes including in, value, units, set, deviation, and high and low values. The system automatically groups VARIABLEs having the same types of attributes together. For example, VARIABLEs venttime, heattime, cooktime and cooltime are grouped together as are VARIABLEs starttemp, prodtemp, cooktemp, bulbtemp and finaltemp. As will be explained in greater detail hereinafter, the VARIABLEs and their attributes form the skeleton of the compiled program which results after the program listing is interpreted or compiled. Each attribute has a type name and a configuration related value. An attribute may also have STATEs derived from its operation or supporting its control. For example, a high alarm attribute has a real value associated with an alarm limit and an alarm state.

The attributes are grouped in the listing into VARIABLE definitions, which are considered to include an initial name attribute, and all following attributes up to the next separated name attribute. The VARIABLE definitions are displayed as a row of values under a corresponding row of the corresponding attribute names, as shown in the FIG. 2 listing. The system automatically recognizes similarly arranged VARIABLEs when they occur consecutively, and arranges them under a single row of attribute type name headings as for example the VARIABLEs venttime, heattime, cooktime and cooltime shown in listing paragraph 50.

During execution, the VARIABLEs are processed in the order in which they have been defined in the VARIABLE DEFINITIONs paragraph. Therefore, the control engineer can control the order of system execution by the order in which VARIABLEs are defined.

As noted previously, a FOOTNOTE is a language structure that allows coordination of low level, detailed activities with the state of execution of larger more fundamental program elements.

As an implementation device, FOOTNOTEs may be used to associate and coordinate low level, detailed activities, with any other higher level language structures. FOOTNOTEs may be placed anywhere in the system. FOOTNOTEs are executable code and calculations. FOOTNOTEs incorporate the details without complicating an otherwise simple program structure. FOOTNOTEs differ from ordinary subroutines because they are only called from one program location and do not have a name. FOOTNOTE may be used to associate the basic calculations with a VARIABLE (attribute) to allow some arbitrary compensation or modification of that VARIABLE. FOOTNOTEs may also be used to coordinate unstructured calculations with those THEME STATEMENTs whose functional focus is control of real process variables.

Figures 3, 4, 5:
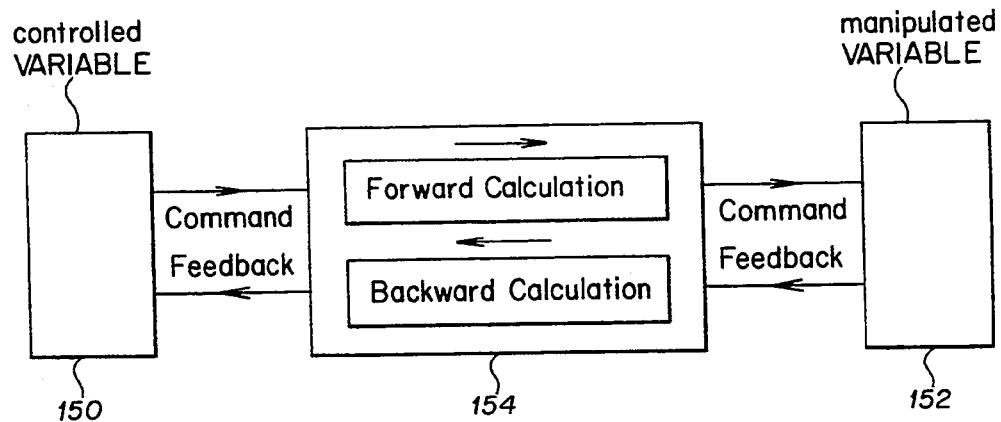
FIG. 3 illustrates an example of a FOOTNOTE language structure of the present invention.
FIG. 4 illustrates a truth table language structure of the present invention.
FIG. 5 illustrates a general form of a LOOP STATEMENT EXPRESSION language structure of the present invention which includes a controlled VARIABLE, an IDIOM, and a manipulated VARIABLE

By contrast, as a language structure visible to the control engineer using the system, FOOTNOTEs are shown in FIG. 3. In one implementation, as shown in FIG. 3, an asterisk (shown at 104) can be placed at the end of a statement or definition entry such as the max attribute of the VARIABLE T100AV. Through appropriate key strokes, a number will automatically be assigned to the asterisk and to a separate location in both memory and on the display (at 106), where a detailed statement may be spelled out. Multiple FOOTNOTEs may be assigned to each attribute of a given variable. In the case illustrated in FIG. 3, the FOOTNOTE calculates the value of the VARIABLE T100AV as the sum of the values of variables T100, T101, T102 which sum is then divided by 3. Multiple FOOTNOTEs may be assigned to individual attributes. For example, FIG. 2, at 102, illustrates two FOOTNOTEs assigned to the value attribute. The calculation of FOOTNOTE [1] appears in the FILTERs/COMPENSATIONs paragraph 70. The calculation of FOOTNOTE [2] appears in the FOOTNOTEs paragraph 60.

A special type of FOOTNOTE is the TEST STATEMENT. To increase comprehension of system calculations, the present invention does not use general boolean operators or abstract true/false (boolean) values, but instead uses truth tables to perform logical computations on application related named STATE values. A truth table, merely by its visual organization provides the necessary idiomatic relationship so that the control engineer can immediately visualize what action is taken upon what conditions simply by viewing the truth table.

The statement illustrated in FIG. 4 is a TEST STATEMENT which is one form that the truth table may take as an independent FOOTNOTE. The format of the TEST STATEMENT is illustrated on line 110 in FIG. 4. The initial TEST keyword sets off the truth table, followed by a sequence of discrete VARIABLE attribute names or references, followed by the :ACTION keyword heading. During processing, the conditions or states of each row, such as row 112, are tested against the corresponding state of the particular variable attribute (C100, C102 . . . ) in each column. The statement of the first row of which all condition entries match the state of their VARIABLE reference, is executed. For example, during execution, if upon activation of the TEST STATEMENT, attribute C101 is off, attribute C102 is off, and attribute C103 is off, then the ACTION executed is to change attribute L100 to off.

A guiding concept of the present invention is still the IDIOM control structure described in the '320 patent. The IDIOM is a control structure for expressing individual control STATEMENTs directly in terms of clear application intentions. As a concept, an IDIOM is a well-developed and standardized control strategy defined by its normal intention, its normal implementation, and the normal practices for connecting its implementation elements together to each other and to the surrounding system to accommodate the relevant control intentions and context. As a language element, the IDIOM is represented as a simple statement of control intention which is compilable or interpretable automatically into a user-adjustable, context-dependent control implementation.

The present invention retains all of the characteristics of IDIOMs described in the '320 patent. In the present invention, the IDIOM is the basic language element which embodies a standard form of control. In the context of the present invention, IDIOMs are used in conjunction with a controlled VARIABLE and a manipulated VARIABLE to form a basic LOOP STATEMENT EXPRESSION. LOOP STATEMENT EXPRESSIONs form the basic language building block. LOOP STATEMENT EXPRESSIONs are "chained" together to form larger LOOP STATEMENTs which exercise control of a process at a higher level than at the IDIOM level. A number of predefined IDIOMs may be provided within the present invention. In more sophisticated versions of the invention, software may be provided allowing the control engineer using the system to define and program custom IDIOMs. IDIOMs contain internal rules that control connection among various IDIOMs so that larger LOOP STATEMENTs can be formed. The names chosen for the IDIOMs are natural language terms which describe a particular form of well-defined control function.

IDIOMs may be further characterized as filter/compensation IDIOMs or control IDIOMs. Control IDIOMs may be further characterized as simple control or fanout IDIOMs.

In a local equipment controller, such as included in the present invention, a relatively small number of IDIOM building blocks may be provided which, as used in LOOP STATEMENT EXPRESSIONs, allow the control engineer to build up LOOP STATEMENTs in natural patterns according to the natural combinations of the different IDIOM structures. A basic set of IDIOMs which may be provided in a local equipment controller of the present invention and which provides the capability to control a wide range of industrial processes is shown in the following Table I:

FILTER/COMPENSATION IDIOMS (Representing simple dynamic filtering and compensation.)

Lead/lag (LEAD/LAG). Filters the input according to a standard lead/lag algorithm. Includes lead and lag time constant parameters.

Dead time (DEAD TIME). Applies dead time compensation to the indicated VARIABLEs according to a dead time algorithm.

Function (FUNCTION). Applies a break point function to the input to compute the output.

CONTROL IDIOMS (Representing basic Loop control support functions.)

Inline IDIOMS

Regulate (REGULATE). Implements the basic PID control computation which can be reduced to P, PI, PD, or I by choice of parameters used in the regulation role.

Support IDIOMS (High or Low) Limit (HILIMIT or LOLIMIT). Places an in-line limit on the value of a controller output.

Feed forward (FEEDFWD). Adds a feed forward compensation to the output of a REGULATE IDIOM's controller.

Ratio (RATIO). Multiplies a ratioed feed forward compensation with the output of a REGULATE IDIOM's controller.

Output (OUTPUT). Allows selection of a separate output to be run from an existing loop output, and displayed in the normal LOOP STATEMENT displays as a separate real or discrete value.

Override IDIOMS (High or Low) Constraint (HICONSTR or LOCONSTR). Uses an appropriate selected selector circuit together with a PID control computation to achieve constraint control with a constraint override controller.

Bypass IDIOMS

Backup (BACKUP). Allows the definition of a secondary control LOOP to take over when a REGULATE IDIOM's main controller output exceeds its natural limit.

FANOUT IDIOMS (Representing those general control functions in which a single loop requires the coordinated manipulation of several valves or loop continuations.)

Blend (BLEND). Allows the definition of an indefinite number of blended flows including pacing action, in a fanout. Blending acts to maintain the proper i.e., stoichiometric ratio of the flows.

Fuel Air Combustion Ratio Control (FUELAIR). This represents the standard selector based safe ratioing of fuel to air. Its purpose is to ensure that control change dynamics always favor an excess of air and avoid fuel accumulation.

Multiple Output Control (MOC). Allows the definition of multiple output control as a fanout supporting a shared load. Allows manual intervention in any path while maintaining intended total control.

Split Range (SPLR). Allows the definition of split range control as a fanout for valve limiting at each valve, where active control moves sequentially from valve to valve as preceding valves reach their limit.

Switched Range (SWR). Allows definition of multiple output valves in a fanout, under control of a specified state value.

The configuration of IDIOMs emphasizes the intended usage of the underlying functions. The control system makes the required detailed connections between LOOP STATEMENT EXPRESSIONs comprising IDIOMs thus freeing the control engineer from the detailed programming process. The control IDIOMs act between two basic VARIABLEs, the VARIABLE which the control IDIOM controls i.e., a controlled VARIABLE, and a manipulated VARIABLE which is manipulated to effect that control.

Reference is now made to FIG. 5, which figure represents a general abstraction of a LOOP STATEMENT EXPRESSION. The LOOP STATEMENT EXPRESSION includes, as its constituent parts, the controlled VARIABLE (having a name and a set of attributes) represented by block 150, the manipulated VARIABLE (having a name and a set of attributes) represented by block 152, and the IDIOM function represented by block 154. In particular, FIG. 5 illustrates a general abstraction of the basic feedback LOOP STATEMENT EXPRESSION since block 154 represents a feedback type IDIOM. As will be explained in greater detail, the LOOP STATEMENT EXPRESSION of FIG. 5 forms the basic functional building block for a "control algebra" in which LOOP STATEMENTs which control multiple variables in a industrial control process are built up by "adding" basic LOOP STATEMENT EXPRESSIONs together. This "addition" is accomplished through "loop continuations" in which the manipulated VARIABLE of a prior LOOP STATEMENT EXPRESSION is used as the controlled VARIABLE of a succeeding LOOP STATEMENT EXPRESSION. The connection between IDIOMs and VARIABLEs in LOOP STATEMENTs is accomplished by passing data messages and data pointers between interpretive calculations supporting the IDIOM function, and the VARIABLEs and their respective attributes. Messaging is automatically accomplished by the system, and is generally invisible to the control engineer. FIG. 5 includes another abstraction of the IDIOM as described in FIG. 1C and the associated description in the '320 patent.

Typically, an IDIOM controls the controlled variable 150 by manipulating the manipulated VARIABLE 152 through some calculated relationship in a "black box" fashion through IDIOM function block 154. In the particular feedback IDIOM illustrated in FIG. 5, block 154 is generally implemented in terms of two calculations, a forward calculation and a backward calculation. The forward calculation sets a command attribute of manipulated VARIABLE 152 as a function of a measured value attribute of the controlled VARIABLE 150. At some time after the manipulated VARIABLE has been controlled (normally within the same sampling time), some attribute representing a measured value of the manipulated VARIABLE 152 is used as the input to a backward calculation to update any internal states or to generate a different feedback value for either the controlled VARIABLE or the manipulated VARIABLE. The calculations performed by IDIOM function block 154 generally use VARIABLE attributes for whatever algorithmic calculation is being performed. The controlled VARIABLE command and feedback attributes serve two roles. First, under feedback control, they are the means for defining the control target and recognizing that the IDIOM must take corrective action to improve control. Second, when that same controlled variable acts as a manipulated variable, they are the means for communication forward to the manipulated target and back to the commanding IDIOM, the success or failure in achieving that target. The manipulated VARIABLE command and feedback attributes transmit the intended control value for the manipulated VARIABLE and feedback the resulting reaction.

In the present invention, IDIOMs are used in LOOP STATEMENT EXPRESSIONs as language building blocks to construct LOOP STATEMENTs. A LOOP STATEMENT reflects the most general control function that can be carried out with a single valve, control loop, or degree of freedom.

In the computer language described in the '320 patent, each IDIOM was programmed as a stand alone control connection between the controlled VARIABLE and the manipulated VARIABLE. In the present invention, LOOP STATEMENTS, which represent a more general control template are programmed by connecting multiple LOOP STATEMENT EXPRESSIONs together through shared VARIABLEs.

As the control engineer constructs a LOOP STATEMENT, the system automatically reflects the engineer's control intention by displaying the LOOP STATEMENT in a particular textual format and by providing a particular iconic representation of the LOOP STATEMENT as shown, for example, in the LOOP STATEMENTs paragraph of the program listing of FIG. 2. The appearance of LOOP STATEMENTs on the display mimics the basic cascading loop block diagram structure which is generally used by a control engineer during the design process.

Figure 6:
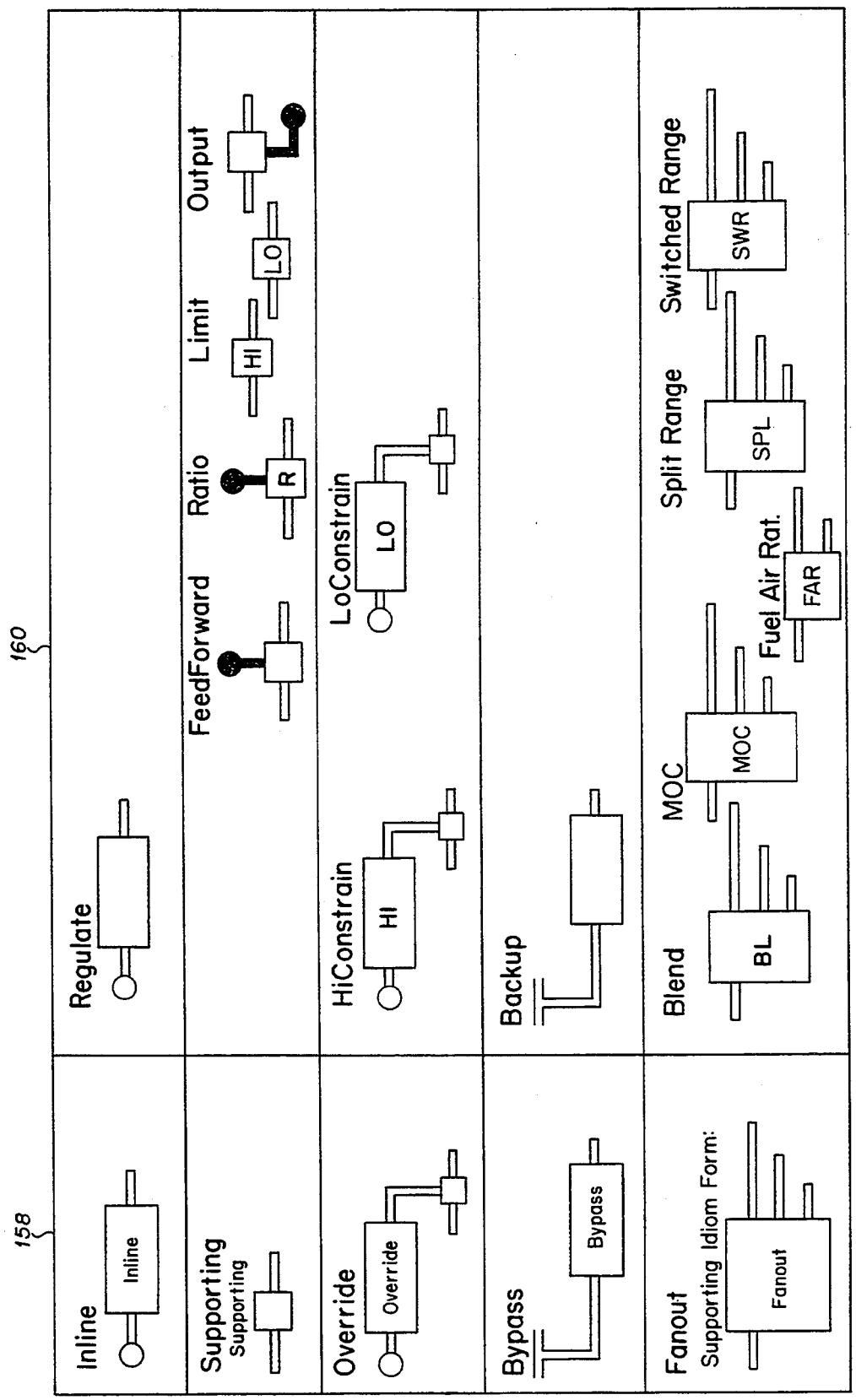
FIG. 6 illustrates exemplary IDIOM icons which form building blocks used in the iconic form of the LOOP STATEMENT EXPRESSION illustrated in FIG. 5.

Reference is now made to FIG. 6, which figure shows five different exemplary iconic representations of the control and fanout IDIOMs described in Table I. Obviously, the icons of FIG. 6 are illustrative examples only, as there may be other icons which can be used to represent the illustrated control functions for particular control applications. Column 158 of FIG. 6 shows the general iconic loop representation for the five basic types of control and fanout IDIOMs provided in the basic set of IDIOMs listed in Table I. Column 160 of FIG. 6 depicts the specialized types of iconic structures available within each class of the general control IDIOMs depicted in column 158. The manner in which LOOP STATEMENT EXPRESSIONs and LOOP STATEMENTs are constructed using the IDIOMs illustrated in FIG. 6 will now be explained in detail. The examples that follow will demonstrate to those skilled in the art the features of IDIOMs and LOOP STATEMENT EXPRESSIONs and how they may be used to generate programs which effect control of industrial processes.

Figure 7:
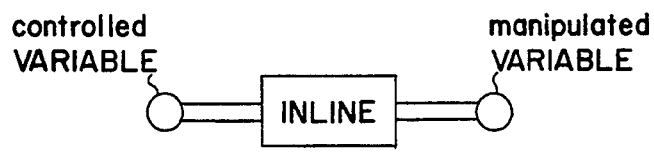
FIG. 7 illustrates the general form of an inline LOOP STATEMENT EXPRESSION language structure.
Figure 8:
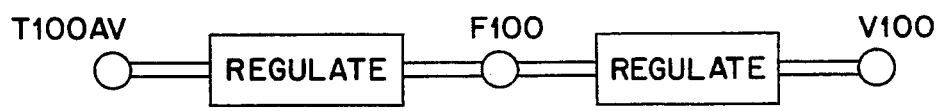
FIG. 8 illustrates the cascading of inline LOOP STATEMENT EXPRESSIONS illustrated in FIG. 7 to form a LOOP STATEMENT language structure.

The INLINE IDIOMs are IDIOMs that participate directly in feedback control action. The general textual form and iconic representation of an INLINE LOOP STATEMENT EXPRESSION is illustrated in FIG. 7. Since the INLINE IDIOM performs a specific idiomatic calculation between the controlled VARIABLE and the manipulated VARIABLE, it is implemented as a FOOTNOTE to the controlled variable and appears as a subscript on the display. INLINE LOOP STATEMENT EXPRESSIONs may be chained together as shown in FIG. 8. The control engineer creates the LOOP STATEMENT shown in FIG. 8 by selecting the variables T100AV, F100, and V100 and connecting T100AV and F100 using the REGULATE IDIOM which appears as a subscript to T100AV (and is implemented as a FOOTNOTE to T100AV). Next the control engineer selects variables F100 and V100 and connects them using the REGULATE IDIOM which appears as a subscript to F100 (and is implemented as a FOOTNOTE to F100). As the control engineer programs in the LOOP STATEMENT, the systems automatically generates and displays the iconic representation, thus providing the control engineer with direct and immediate feedback of the control function which results. The control engineer programs in the LOOP STATEMENT in the order in which it is desired that a VARIABLE be manipulated and controlled. There is no limit to the number of basic LOOP STATEMENT EXPRESSIONs that may be connected together to form a LOOP STATEMENT. The only constraint is that the degree of freedom chain from IDIOM to IDIOM as the LOOP STATEMENT is build up must eventually lead to some final terminal VARIABLE which does not act as a controlled VARIABLE for an IDIOM and which represents a process actuator or its equivalent.

Figure 9:
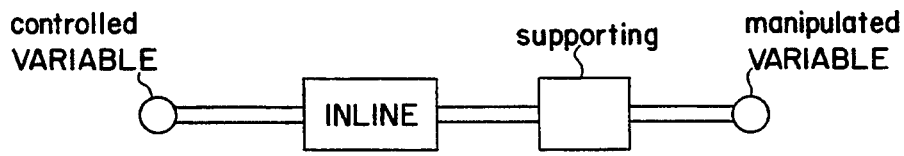
FIG. 9 illustrates the general form of a supporting LOOP STATEMENT EXPRESSION language structure as it modifies an inline LOOP STATEMENT EXPRESSION.

The supporting control IDIOMs are expressed visually as additional subscripts (and implemented as FOOTNOTEs) to an existing INLINE VARIABLE already having an IDIOM subscript. FIG. 9 illustrates the general textual form and iconic representations of a supporting LOOP STATEMENT EXPRESSION.

Figure 10:
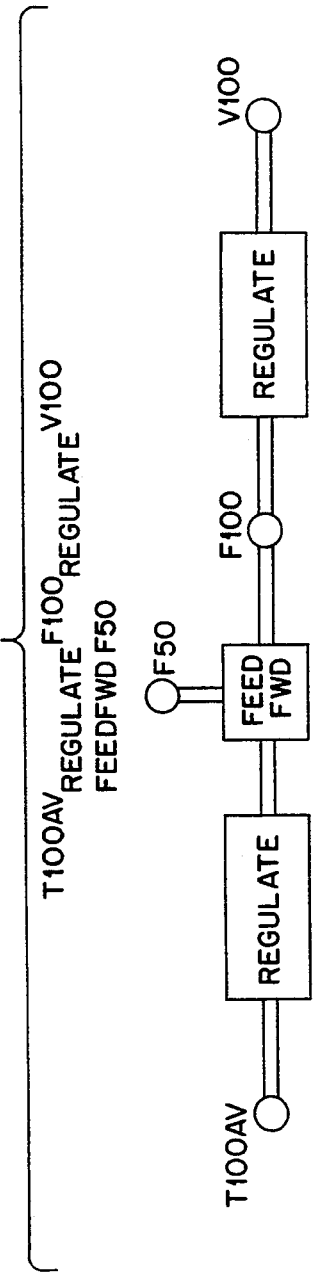
FIG. 10 illustrates a feedforward example of the supporting LOOP STATEMENT language structure.

FIG. 10 illustrates an example of the textual and iconic representations of a LOOP STATEMENT, which uses a supporting LOOP STATEMENT EXPRESSION, applied between the controlled VARIABLE T100AV and the manipulated VARIABLE F100. In particular, FIG. 10 illustrates a LOOP STATEMENT incorporating a feedforward LOOP STATEMENT EXPRESSION. In the particular case of the feedforward (and ratio and output) IDIOMS, a separate argument variable (F50) represents the extra data sources or sinks used by these IDIOMs. These extra variables do not participate in the operation or control degrees freedom and therefore are not expressed as variables in the main LOOP STATEMENT line.

Figure 11:
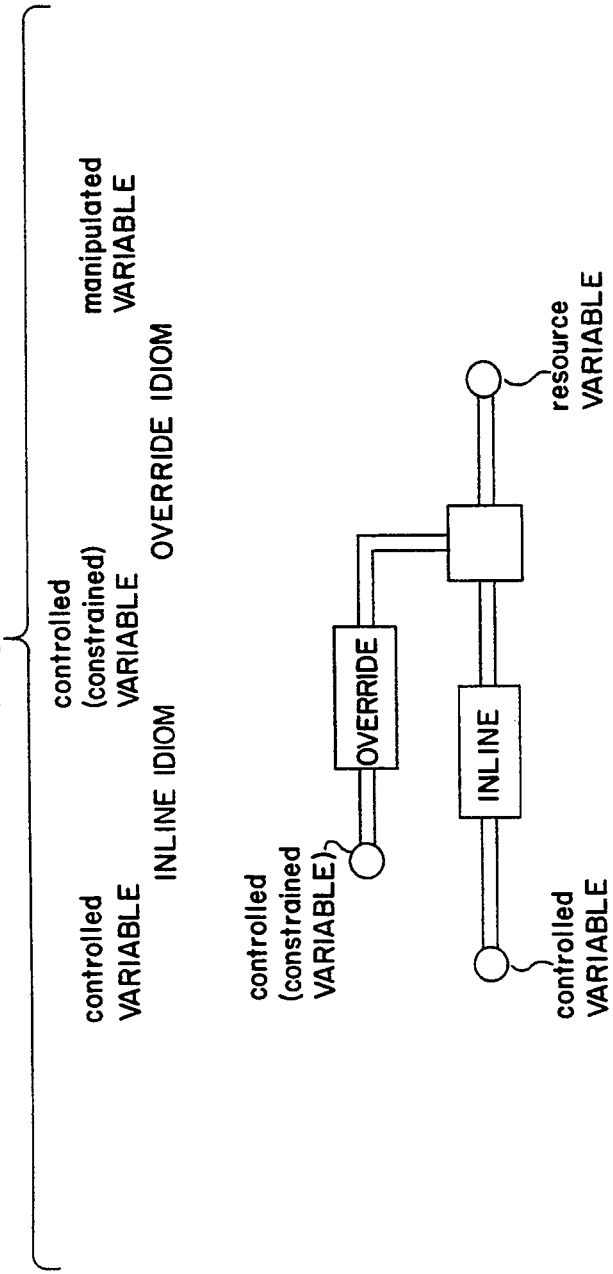
FIG. 11 illustrates the general form of an override LOOP STATEMENT EXPRESSION language structure as it modifies an inline LOOP STATEMENT EXPRESSION.

FIG. 11 illustrates the general textual and iconic representations of the override LOOP STATEMENT EXPRESSIONs. Override IDIOMs express some central constraint that must override the normal course of control if the constraint is violated. This control combination is represented .naturally in the textual LOOP STATEMENT EXPRESSION by an inserted VARIABLE$_{OVERRIDE}$ subscripting pattern.

Figure 12:
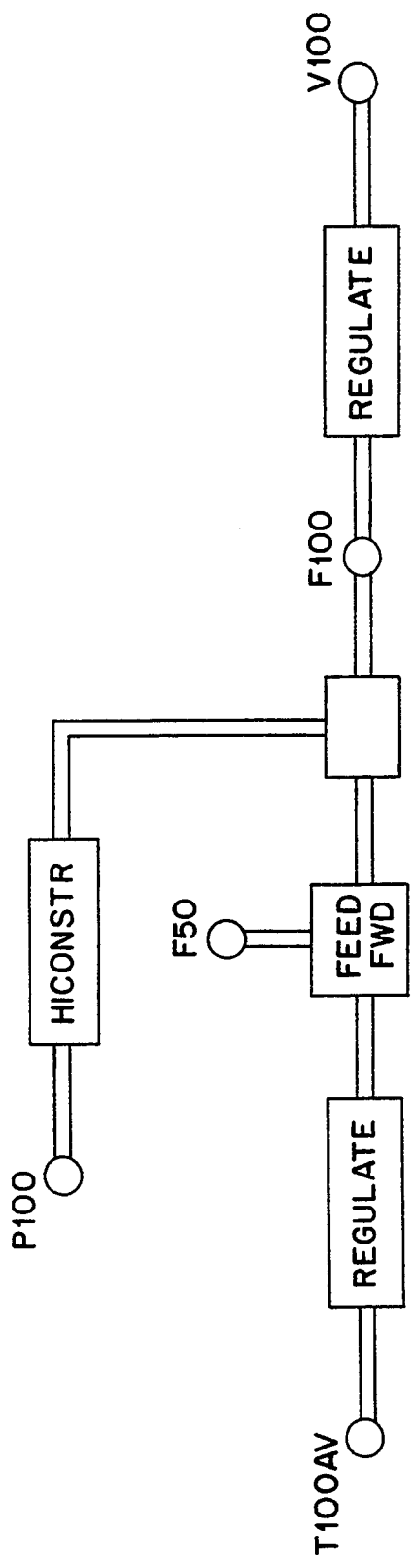

FIG. 12 illustrates an example of the textual and iconic representations of a LOOP STATEMENT incorporating an override LOOP STATEMENT EXPRESSION. In particular, FIG. 12 illustrates a LOOP STATEMENT incorporating a high constraint LOOP STATEMENT EXPRESSION. In FIG. 12, the $P100_{HICONSTR}$ pattern represents the override IDIOM. In this example, if an attribute of the variable P100 should vary from the target value calculated by the high constraint IDIOM, the target attribute of the variable F100 (normally manipulated by the REGULATE and feedforward IDIOMs) will be controlled to prevent the attribute of P100 from exceeding its target value.

BYPASS IDIOMs express alternative control paths. FIG. 13 illustrates the general textual and iconic representations of a BYPASS LOOP STATEMENT EXPRESSION. The BYPASS IDIOM, under specified conditions, controls the controlled VARIABLE via the first manipulated VARIABLE. Under normal conditions, the INLINE IDIOM controls the controlled VARIABLE by manipulating the second manipulated VARIABLE.

FIG. 14 illustrates an example of the textual and iconic representations of a LOOP STATEMENT incorporating a BYPASS LOOP STATEMENT EXPRESSION. In particular, FIG. 14 illustrates a LOOP STATEMENT incorporating a backup LOOP STATEMENT EXPRESSION. In FIG. 14, the backup loop continuation consists of the single VARIABLE V100. The normal loop continuation is the expression $P100_{HICONSTR}F100_{REGULATE}V200$ which could include further cascaded LOOP STATEMENT EXPRESSIONs. The backup loop continuation V100 may be used as the basis for connecting additional LOOP STATEMENT EXPRESSIONs to the LOOP STATEMENT.

Fanout IDIOMs express the coordinated control of several loop continuations to a common goal. They are expressed by an IDIOM subscript followed by an open ended sequence of loop continuations. FIG. 15 illustrates the general textual and iconic representations of a fanout LOOP STATEMENT EXPRESSION. In FIG. 15, the first loop continuation is the expression within brace 162, the second loop continuation is the expression within brace 164, the third loop continuation is the expression within brace 166, and so on.

FIG. 16 illustrates an example of the textual and iconic representations of a LOOP STATEMENT incorporating a fanout LOOP STATEMENT EXPRESSION. In particular, FIG. 16 illustrates a LOOP STATEMENT incorporating a BLEND LOOP STATEMENT EXPRESSION. The BLEND LOOP STATEMENT of FIG. 16 represents the blending of three flows, F100, F200, and F300, (manipulated VARIABLES) each controlled in a flow LOOP. Each of the manipulated VARIABLEs in the fanout LOOP STATEMENT may form the basis for further loop continuations.

The above descriptions of LOOP STATEMENTs are meant to be exemplary only and are not limiting of the invention. One skilled in the art will appreciate that the basic LOOP STATEMENT EXPRESSION illustrated in FIG. 5 may be used, in combination with multiple loop continuations, to construct many different LOOP STATEMENTs for control of industrial processes. Additionally, software may be provided in the local equipment controller to allow a control engineer to define custom LOOP STATEMENTs and custom IDIOMs for particular process control applications.

In general, the arrangement of IDIOMs in a LOOP STATEMENT can be restated as a chain of actions which must be carried from a primary controlled VARIABLE and its set point through intervening constraint overrides, feedforwards, and fanouts to the terminal VARIABLE actuator actions. The actions are embodied in the execution of the corresponding sequence of forward calculations. Backward calculations are then carried out, in effect in reverse order, to recognize any control action bounding, override, or failure effects which prevent the system from carrying out the intent of any LOOP STATEMENT EXPRESSION in the LOOP STATEMENT chain.

A feature of the present invention, which emphasizes its application to industrial process control and the ability to relieve the control engineer of detailed programming operations concerns the manner in which LOOP STATEMENTs may be programmed. One skilled in the art will appreciate that the textual version of a LOOP STATEMENT is equivalent to its iconic representation. Therefore, a control engineer may generate LOOP STATEMENTs either by programming the LOOP STATEMENTs textually or by graphically connecting IDIOM icons, such as those illustrated in FIG. 6, with appropriate controlled VARIABLEs and manipulated VARIABLEs in an appropriate manner in order to achieve the control objectives. The control engineer programs a LOOP STATEMENT, either textually or iconically, to reflect the proper control sequence of processing of the variables.

The LOOP STATEMENT structure replaces the IDIOM SPACE, BLOCKs and DETAILs pages of the system described in the '320 patent. In the '320 patent, each IDIOM stands alone as its own separate control device. By contrast, in the present invention, LOOP STATEMENT EXPRESSIONs are chained together to form LOOP STATEMENTs which are executed in the order in which the control engineer constructs the LOOP STATEMENT.

A skilled control engineer using the present invention will know of all of the various LOOP STATEMENT EXPRESSIONs available which he may use to create LOOP STATEMENTs. However, the system may also be implemented so that the various IDIOM choices are listed in a menu on some part of the LOOP STATEMENT display which the user then may select to form the required control loop.

THEME STATEMENTs represent a further refinement of the NATURAL LANGUAGE STATEMENT described in the '320 patent. In the present invention, THEME STATEMENTs represent the top level of operationally visible control configuration. THEME STATEMENTs describe a processing function at a higher level than a simple list of LOOP STATEMENTs. They may embody specialized forms of batch, sequenced, or continuous control. A THEME STATEMENT is a language structure which is based on a template for a particular type of control task (as for example, an if/then statement template is used in other general purpose programming languages). THEME STATEMENTs are defined to conform to a format applicable to the particular type of statement which may include repeating patterns (i.e., commands) within a single THEME STATEMENT. Each type and format reflects some generic higher level sequencing or coordination function. THEME STATEMENTs can include their own language structure FOOTNOTEs representing actions coordinated with the THEME STATEMENT. Alternatively, THEME STATEMENTs coordinate other activities with their own state driven truth tables or by controlling states which effect state condition controls elsewhere in the program. This later mechanism allows the THEME STATEMENT to control the operation of LOOP STATEMENTs or other controls. Typically, a single THEME STATEMENT is used for each single vessel processing unit being controlled such that the THEME STATEMENT defines for that unit the overall coordination and control of the particular process. Thus, the name THEME STATEMENT flows naturally as a consequence of the type of control intention being exercised.

An exemplary set of THEME STATEMENTs which may be provided in a local equipment process controller of the present invention and which have application to a variety of industrial control processes is listed in the following Table II:

Blend. This statement carries out the BLEND IDIOM as a primary LOOP function. The BLEND THEME STATEMENT expresses those situations where a continuous or batch blend dominates the process.

Profile. This statement expresses the coordinated operation of several otherwise unconnected loops. For example the integrated display of several temperature loops separately applied to the process.

Ramp. This statement allows the description and sequencing of a controlled time profile for some real process VARIABLE. It represents a language structure counterpart to a cut-cam follower.

Sequencer. This statement defines the sequencing of a set of logical (state valued) VARIABLEs, Timer. This statements performs a function similar to the sequencer statement, where timing plays an operationally significant part in the process control.

Stream. This statement coordinates production operations occurring in different plant locations, particularly in the context of a well defined production line.

One skilled in the art will appreciate that the above set of THEME STATEMENTs is exemplary only and is not limiting of the invention. For example, software may be provided in the local equipment controller to allow a control engineer to custom design THEME STATEMENTs specific to particular specialized process control applications. Furthermore, one skilled in the art will appreciate that the concept embodied by THEME STATEMENTs is not limited to the particular examples given. A THEME STATEMENT is meant to comprehend any natural language statement which provides a readily understood overall control intention statement for industrial process control. THEME STATEMENTs include command strings which execute in realtime and language structure FOOTNOTE statements that are coordinated with realtime dependent events occurring during THEME STATEMENT execution. THEME STATEMENTs may exercise control based on system states or values of VARIABLE attributes.

The BLEND, PROFILE, and RAMP statements illustrate a THEME STATEMENT type wherein the focus is on control of real variables. For example, the ramp statement allows the time coordination of related operations through FOOTNOTEs. By contrast, the sequencer, timer, and stream statements focus on the control of discrete VARIABLEs. The sequencer, timer, and stream statements take the form of a variation of the truth table, the general decision making device utilized in the present invention.

THEME STATEMENTs are recognized by the control engineer as well as by the system during processing through the use of an initial distinguishing keyword. For example, FIG. 17 illustrates a simple THEME STATEMENT, namely, the blend statement. The BLEND THEME STATEMENT template consists of the BLEND keyword, followed by a list of the names of the VARIABLEs to be blended, namely, F100, F101, and F102.

FIG. 18 illustrates an example of the RAMP THEME STATEMENT. The ramp statement generalizes the requirement for programmed production ramping or sequenced profiles of processed variables. It models the behavior of a cut-cam follower type of control. As illustrated in FIG. 18, the ramp statement template includes an initial RAMP keyword 170, followed by a sequence of clauses 172, each clause defining one transition in terms of its starting point, final point, duration, and transitional form.

The clauses of the ramp statement are constructed out of phrases, each defining an initial or final profile value, or a transition time, or a transitional form. The phrases each consist of an initial keyword 174. The following list provides exemplary illustrations of keywords which may be used in typical ramp statements:

FROM. From precedes the initial profile value for the given clause when a ramped transition is to take place.

TO. To precedes the final value for a ramped profile.

IN. In precedes a transition duration period.

AT. At precedes a constant profile value if the profiled VARIABLE is to be held constant for an interval of time.

FOR. For precedes the duration of time at constant value under an AT phrase.

DUAL MODE. Dual mode precedes a clause describing "bang-bang" type control.

As illustrated in FIG. 18, these particular keywords and their natural language meanings provide a visually clear indication of the operation that the THEME STATEMENT is describing to the control engineer. The ramp statement of FIG. 18 describes an operation in which the TEMP VARIABLE is ramped for a length of time defined by a VARIABLE venttime, heated to a cook temperature defined by a VARIABLE cooktemp plus a bias VARIABLE within a time limit defined by a variable heattime, cooked at the cook temperature for a length of time defined by a VARIABLE cooktime and then cooled to zero in a time limit defined by the VARIABLE cooltime by ramping the VARIABLE P100.

FIG. 18 also illustrates the use of secondary ramping statements such as the ramp P100 statement. Ramping may be applied to a progression of variables.

FIG. 18 also illustrates the use of FOOTNOTEs within THEME STATEMENTs. The FOOTNOTEs corresponding to bracketed numbers 1–7 in section 172 of the ramp statement are displayed in section 176 of the ramp statement. FOOTNOTEs can be keyed on the initial VARIABLE, or on the clauses in such a way that additional controls can be coordinated with the associated transition, or with its beginning or end. Each clause in portion 172 may also be associated with an optional, initially named (and emphasized in italics in FIG. 18), user defined state (for example: start, heat, cool, cook).

Reference is now made to FIGS. 19, 20, and 21, which figures illustrate THEME STATEMENTs which make use of and are programmed through truth tables. The truth table format is the template for these types of THEME STATEMENTs. FIG. 19 is an example of a SEQUENCER THEME STATEMENT. FIG. 20 is an example of a TIMER THEME STATEMENT. FIG. 21 is an example of a STREAM THEME STATEMENT. As with the truth table illustrated in FIG. 4, each of the THEME STATEMENTs illustrated in FIGS. 19-21 uses a series of conditions, the satisfaction of which results in some predefined action. The resulting predefined action is the mechanism by which the THEME STATEMENT exercises overall control of the particular process.

Having thus explained the concepts and language structure involved in the invention, it will be apparent that these concepts and language structures are utilized and put into practice by writing a translator (i.e., an interpreter or compiler) for accepting statements expressed in this language structure and generating interpreted or compiled program code therefrom. The interpreted or compiled program code provides the actual instructions to the computer, corresponding to the statements written by the control system designer.

Programs written in the present language structure are translated to an internal format in which the program structures are represented by a single data structure. This data structure is the SUPERVARIABLE. The writing of a translator based on the foregoing description and in further conjunction with the following description of the SUPERVARIABLE at the method of processing the SUPERVARIABLE is within the skill of systems programmers. In particular, the invention and translator may be implemented using the methods described in the '320 patent. An appropriate version of the C programming language may be used to implement the translator.

In the system described in the '320 patent, each of the language structures used an individual corresponding data structure. By contrast, in the present invention, only a single data structure, the SUPERVARIABLE, is used, into which is compiled the data represented by each of the language structures. The system database is thus implemented as a single list of contiguous attributes and footnotes, whose execution consists of the consecutive interpretation of the elements. This model of execution simplifies the system programming. But it also gives the user a clear and simple definition of the timing and synchronization effects of the designed application program.

In conventional database structures, the procedural program database, the control block database, and the process variable database are generally separated into three distinct data structures. By contrast as illustrated in FIG. 22, the SUPERVARIABLE database of the present invention incorporates the attributes of the VARIABLEs and the various control implementation FOOTNOTEs into one long string. As shown in FIG. 22, each attribute and implementation FOOTNOTE is stored with an appropriate type code which allows the translator to recognize the attribute type and invoke the appropriate interpretive actions. PROCEDURES, THEME STATEMENTs, computational (language structure) FOOTNOTEs, and IDIOMs are represented by and stored as implementation FOOTNOTEs in the SUPERVARIABLE.

As noted previously, the present invention utilizes a single date structure. Each of the program listing paragraphs that appears on the control engineer's display as illustrated in FIG. 2 is not a separate data structure, but rather a portion of the SUPERVARIABLE database that has been processed by the display software to extract the required data from the SUPERVARIABLE and then display that data in a format such as that illustrated in FIG. 2.

The SUPERVARIABLE representation of the program database is created in the following manner. A contiguous block of memory such as 180 in FIG. 22 is set aside by the system. Within this block of memory, portions 182 are set aside to store attribute data and a typecode identifying the type of data. For example, within memory portion 183, a representation 185 of the VARIABLE name venttime (shown at 184 in FIG. 2) is stored. Additionally, a type code 187 is stored in memory portion 183 indicating that the data stored in memory portion 183 is a VARIABLE name. In the next portion 186 of memory, a representation 189 of the value "3" and a type code 191 indicating that the data stored in memory portion 186 represents the time attribute of the venttime VARIABLE is stored. In memory portion 188, a representation 193 of the attribute "minute" along with a type code 195 indicating that the attribute is a units type attribute is stored. This process is repeated for each of the VARIABLEs shown in the VARIABLEs definitions paragraph 50 of the program listing in FIG. 2. The list of VARIABLEs and attributes in the SUPERVARIABLE format as shown in FIG. 22 forms the basic skeleton of the database for the present invention. Thereafter, the calculations which are implemented as implementation FOOTNOTEs, such as language structure FOOTNOTEs, FILTERs/COMPENSATIONs, LOOP STATEMENTs, THEME STATEMENTs, and PROCEDUREs are stored in memory portions 190. These computational FOOTNOTEs which act upon the various attributes are referenced to the attributes by pointers. LOOP STATEMENTs are parsed into the individual IDIOMs which make up the LOOP STATEMENT. The individual IDIOMs are then stored in implementation FOOTNOTEs 190 with pointers which reference the controlled VARIABLE and the manipulated VARIABLE locations in the SUPERVARIABLE to the implementation FOOTNOTE which stores a particular IDIOM.

The SUPERVARIABLE representation of the system database, as illustrated in FIG. 22, with the listed attributes, FOOTNOTEs, and associated type codes, permits the basic computational processing to be carried out in a single interpretive program scan. The program scan begins at the first memory location of the SUPERVARIABLE and continues to the last contiguous memory location. The scan may be repeated at fixed varying intervals such that the program continuously runs to achieve the desired control of the industrial process. The fixed pattern of execution provides for reduced processing overhead due to the fixed program scan.

To support this kind of data structure, the present invention makes use of a memory management strategy which continually repacks the list of FOOTNOTEs and attributes to allow the insertion of newly configured and edited data. FIG. 23 illustrates the memory management data structure utilized. As the control engineer is editing or writing a program, the system creates a space or "memory hole" in the SUPERVARIABLE memory representation shown at 210. This memory hole corresponds to the portion of the program listing of FIG. 2 (for example) which the control engineer is currently editing or writing. The portions of the program beyond this point are repacked to the end of the memory. The new program elements can thus be stored into memory hole 210. The system functions to create these memory holes as program elements which need to be inserted into the SUPERVARIABLE are generated.

This organization provides several advantages. First, the control elements are stored into the SUPERVARIABLE in a manner which directly reflects their order in the progressive control calculations. Second, since the program is executed by scanning the SUPERVARIABLE database and executing program elements as they are encountered, program execution occurs in a predictable manner. Thus, the control engineer is relieved of the need of making sure that the program executes its functions in the desired order and with the desired hierarchy of control, since the SUPERVARIABLE database organization and memory management guarantees the order of execution.

A conventional control system usually has a single database and separate processes for workstation configuration, operator display, program scan processing, trend processing and display and process I/O. This type of organization generally requires some kind of operating system framework to define the relationship between the processes. By contrast, in the present invention, the SUPERVARIABLE representation of the system database makes the order of processing explicit. It emphasizes the sample time dependent character of real time industrial control processes, and permits the best choice of phasing between the parts of the system. Referring to FIG. 24, an exemplary ordering of the system functions within a scan loop might be as follows: process input I/O, program scan, process output I/O, trend record processing and display, operator display processing, and configuration window display and configuration processing.

The operation of the invention is coordinated by two program loops, the interrupt loop driven by the I/O interrupts and the scan loop driven by the program sample time. The scan timing of the program scan loop is controlled by a system clock.

Both of the program loops illustrated in FIG. 24 contain repetitive subordinate functions such as the program scan and operator display, which are driven by the scheduling of their respective superior loop. Due to the loop repetition, each of these functions can be treated as if it were an independent loop as illustrated in FIG. 25. The implementation effectively combines the sum of the resulting, independent, subordinate loops into one larger loop, as also shown in FIG. 25.

Referring now to FIG. 26, there are shown two human user interface loops which comprise the interrupt loop of FIG. 24. The interrupt loop is a fast response user feedback system which provides the processing interface between user input and the system. The functional loop is used to perform configuration functions and provides the processing interface between a user changing parameters during program execution and the system.

As mentioned in conjunction with FIG. 22, the compiled database of the present invention takes the form of one long continuous task list. FIG. 27 illustrates the resulting data structure of the SUPERVARIABLE after compilation. The interpreter that processes the data structure 200 in FIG. 26 must be able to differentiate the elements in order to permit their distinct computational execution. Therefore, as each attribute or FOOTNOTE in the SUPERVARIABLE listing is encountered, the system compiles the element into a distinctive format consisting of an initial distinguishing code, i.e., a typecode, shown at 202, followed by the detailed data representing the particular kind of attribute or FOOTNOTE, shown at 204. This structure resulting after compilation is illustrated in data structure 206 in FIG. 27.

FIG. 28 illustrates the processing carried out by the system during a SUPERVARIABLE program scan. Attributes and FOOTNOTEs are, for the most part, interpreted in the natural scan order. However, it is also necessary to deviate from the natural processing order (as with I/O processing) or relate the calculation of one attribute to the data of another (as in the case of scaling and alarm functions). Furthermore, LOOP STATEMENT EXPRESSIONs which make up the larger loop statements require a reversal of order for the back calculation functions used to provide feedback for alteration of control targets. Three mechanisms, illustrated in FIG. 28, are used to support forwarding of data and the back calculation function. Value buffers represent addressable data locations used to temporarily store or pass any desired data. Value pointers represent pointer locations, which may be set to point to any attribute location, making it available to some later interpretive routine. Stacks allow the reversal of the natural order by permitting the successive storage of any data or pointer elements so that they may be recovered in reverse order, for later processing, or for reverse order processing of already processed interpretive actions.

Reference is now made to FIG. 29, which figure illustrates the interpretation of SUPERVARIABLE elements during a program scan. The SUPERVARIABLE scan consists of a linear scanning of the attributes and FOOTNOTEs making up the SUPERVARIABLE, executed once every control sample time. Scanning consists of picking up each element in the SUPERVARIABLE (attribute or FOOTNOTE) in succession, determining its type, and executing the appropriate (according to the attribute type) interpreting algorithm on the attribute data value and then proceeding on to the next element in the SUPERVARIABLE.

Since the database of the present invention is implemented as one long task list in the SUPERVARIABLE, special display processing is necessary in order to display data to a control engineer or operator in an appropriate manner. For example, FIG. 30 illustrates one method of processing which may be used to translate from the SUPERVARIABLE representation to a display suitable for a user. The display software steps through the SUPERVARIABLE during a particular scan and selects appropriate data based on the attribute type code associated with each particular memory portion. The display software in effect parses the SUPERVARIABLE to extract data elements from the SUPERVARIABLE as necessary to generate operator displays. The display software extracts this data and stores it in display buffers respectively associated with each particular language structure. The particular display buffers and formats involved change as the operator displays different parts of the operation (i.e., LOOP STATEMENTs and THEME STATEMENTs). The data used to construct a particular display is derived from the language structure control statements. For example, data for a LOOP STATEMENT display is derived from the particular LOOP STATEMENT of interest. Each time a particular display is generated, the display buffer is overwritten with the data necessary for the desired display. The display buffer is updated during each sample time for as long as the operator maintains the display active. FIG. 30 particularly illustrates data being extracted and stored in display buffers for LOOP STATEMENTs and RAMP THEME STATEMENTs. The display buffers are updated each time the trend display loop is active. The operator display function software then interprets this data using its data block type codes to generate the necessary displays.

Reference is now made to FIG. 31, which figure illustrates a LOOP STATEMENT which the system operator desires to display. Using the method of display generation illustrated in FIG. 30, the LOOP STATEMENT of FIG. 31 is processed to generate the trend display illustrated in FIG. 32.

Referring more particularly to FIG. 32, there is shown a trend display of the LOOP STATEMENT of FIG. 31. FIG. 32 illustrates the behavior of the VARIABLEs (T100AV, P100, F100, V100) over time. The y-axis of the display in FIG. 32 represents a value attribute of the particular variable. The x-axis in the display of FIG. 32 represents a time axis. Portion 250 of the display displays the measured and set values of the variables shown in column 252. Portion 254 of the display illustrates the iconic representation of the LOOP STATEMENT of FIG. 31.

When the operator selects the trend display, the system proceeds through the steps illustrated in FIG. 30 in order to generate the faceplate data which is then stored in an appropriate display buffer. As long as the operator maintains the trend display of FIG. 32 active, the display illustrated at portion 254 will continue to be updated.

The present invention may include a user interface that can be implemented in the form of menu structures and menu objects for each of the language structures of the invention. The menu structure may be organized into a hierarchy which corresponds to the hierarchy of language structures. Thus, the operator displays can be controlled and generated in a straight forward calculation from the SUPERVARIABLE database, thus reducing the implementation effort required, as well as incorporating the user interface structure into the overall language organization.

Having thus described one particular embodiment of the invention, various alterations, modifications, and improvements will readily occur to those skilled in the art. Such alterations, modifications, and improvements as are made obvious by this disclosure are intended to be part of this disclosure though not expressly stated herein, and are intended to be within the spirit and scope of the invention. Accordingly, the foregoing description is by way of example only and is not intended as limiting. The invention is limited only as defined in the following claims and the equivalents thereto.

What is claimed is:

1. A computer controlled industrial process controller for controlling a single vessel processing unit, comprising:

a computer;

means for programing the computer using a language structure organized in a hierarchy of control function and having language structure templates which define standardized forms of process control, the language structure further comprising natural language statements reflecting process control intentions used in the language structure templates wherein the process control intentions specify process control objectives without specifying detailed, implementing calculations;

means, within the controller, for translating the language structure templates into executable program code, which code automatically provides control connections among the language structure templates;

means, within the controller, for translating the natural language statements reflecting process control intentions into program code executable by the computer;

means, within the controller, for executing the program code to control production of a product in the single vessel processing unit;

wherein the language structure templates include structures, called loop statement expressions, which are translated into program code and executed by the means for executing for controlling a measured process variable by manipulating at least one manipulated variable according to a predetermined idiom function;

wherein the loop statement expression comprises the measured process variable, the predetermined idiom function, and the at least one manipulated variable; and wherein the language structure templates and the natural language statements are translated into a string of footnotes and associated attributes in a sequence defining an order of execution of the program code, each footnote defining a calculation to be performed.

2. The controller of claim 1, wherein the hierarchy of control function comprises a three-level hierarchy providing sequencing and coordination at a first level, continuous loop control at a second level, and I/O point operation at a third level.

3. The controller of claim 1, wherein the loop statement expressions include graphical icons reflecting control intentions.

4. The controller of claim 1, wherein the language structure templates include structures, called theme statements, which are translated into program code and executed by the means for executing, for providing overall control of production of the product, the theme statements each including at least one distinguishing natural language keyword reflecting a control intention and defining a process to be performed, and at least one variable, operatively associated with the keyword to be manipulated according the defined process.

5. A method of operating a computer controlled industrial process controller for controlling a single vessel processing unit, comprising the steps providing a computer;

providing a language structure for programming the computer, the language structure organized in a hierarchy of control function and having language structure templates which define standardized forms of process control, the language structure further comprising natural language statements reflecting process control intentions used in the language structure templates wherein the process control intentions specify process control objectives without specifying detailed, implementing calculations;

translating, by the controller, the language structure templates into executable program code, which code automatically provides control connections among the language structure templates;

translating, by the controller, the natural language statements reflecting control intentions into program code executable by the computer;

executing, by the controller, the program code to control production of a product in the single vessel processing unit;

wherein the language structure templates include structures, called loop statement expressions, which are translated into program code and executed by the controller for controlling a measured process variable by manipulating at least one manipulated variable according to a predetermined idiom function;

wherein the loop statement expression comprises the measured process variable, the predetermined idiom function, and the at least one manipulated variable; and wherein the steps of translating the language structure templates and translating the natural language statements include translating the templates and statements into a string of footnotes and associated attributes in a sequence defining an order of execution of the program code, each footnote defining a calculation to be performed.

6. The method of claim 5, wherein the step of translating into a string of footnotes and attributes includes translating the footnotes and attributes into a continuous sequential string of typecodes, each typecode containing the footnote calculation and a code identifying a type of calculation and data to be used by the calculation.

7. The method of claim 6, wherein the step of executing the program code includes executing, during a sample time of the controller, the string of typecodes and data starting at a beginning of the string and step by step scanning through the string, performing each calculation in the order in which each calculation is encountered in the string until the end of the string is encountered, returning to the beginning of the string and repeating the step by step scan.

8. The method of claim 7, further comprising the step of generating displays indicative of system operations from the string of typecodes and data during scanning.

9. The method of claim 5, wherein the language structure templates include graphical icons reflecting control intentions and defining a relationship among program elements.

10. The method of claim 5, wherein the step of controlling production of a product further comprises controlling at least one parameter of a process carried out in the single vessel processing unit.

* * * * *